(12) United States Patent
Kusakabe

(10) Patent No.: US 10,148,159 B2
(45) Date of Patent: Dec. 4, 2018

(54) MAGNETIC ROTATING APPARATUS, ELECTRIC MOTOR, AND MOTOR GENERATOR

(71) Applicants: NARITA CO., Ltd., Hirakata-shi, Osaka (JP); Kayoko Mukai, Hirakata-shi, Osaka (JP)

(72) Inventor: Kiyonari Kusakabe, Hirakata (JP)

(73) Assignees: NARITA CO., LTD., Osaka (JP); Kayoko Mukai, Osaka (JP)

( * ) Notice: Subject to any disclaimer, the term of this patent is extended or adjusted under 35 U.S.C. 154(b) by 391 days.

(21) Appl. No.: 15/019,798

(22) Filed: Feb. 9, 2016

(65) Prior Publication Data
US 2016/0172947 A1    Jun. 16, 2016

Related U.S. Application Data

(63) Continuation of application No. PCT/JP2014/004158, filed on Aug. 8, 2014.

(30) Foreign Application Priority Data

Aug. 9, 2013  (JP) ................................. 2013-166694
Aug. 6, 2014  (JP) ................................. 2014-160022

(51) Int. Cl.
*H02K 16/00* (2006.01)
*H02K 1/27* (2006.01)
(Continued)

(52) U.S. Cl.
CPC .............. *H02K 16/00* (2013.01); *H02K 1/143* (2013.01); *H02K 1/276* (2013.01); *H02K 1/2746* (2013.01);
(Continued)

(58) Field of Classification Search
CPC ........ H02K 16/00; H02K 47/20; H02K 1/276; H02K 1/2766
See application file for complete search history.

(56) References Cited

U.S. PATENT DOCUMENTS 4,327,302 A * 4/1982 Hershberger ......... D06F 37/304
                                                310/156.56
4,417,168 A * 11/1983 Miller .................. H02K 1/2726
                                                310/156.52
(Continued)

FOREIGN PATENT DOCUMENTS

CA    2168977 A1   12/1995
CN    1325172 A    12/2001
(Continued)

OTHER PUBLICATIONS

European Patent Office, "Communication with Extended European Search Report," issued in connection with European Patent Application No. 14834626.5, dated Mar. 3, 2017.
(Continued)

*Primary Examiner* — Dang Le
(74) *Attorney, Agent, or Firm* — Birch, Stewart, Kolasch & Birch, LLP

(57) ABSTRACT

A high-efficient magnetic rotating apparatus and motor generator are provided which are capable of further reducing a detent torque. The magnetic rotating apparatus and the motor generator each includes a stator in which cores with a winding are disposed and a rotor in which permanent magnets are disposed. The permanent magnet has a magnetic pole of an N-pole or an S-pole and has a counter face, opposed to the core, with an inclination angle. In each set of magnet bodies, the two permanent magnets are so disposed that two counter faces have different magnetic poles and are inclined reversely. The two permanent magnets are magnetically connected through a joint member made of a
(Continued)

magnetic material so that the two counter faces act as magnetic poles on both ends of the magnet body.

30 Claims, 21 Drawing Sheets

(51) Int. Cl.
*H02K 1/14* (2006.01)
*H02K 47/20* (2006.01)
*H02K 21/14* (2006.01)
*H02K 11/33* (2016.01)
*H02K 29/03* (2006.01)

(52) U.S. Cl.
CPC ........... *H02K 1/2753* (2013.01); *H02K 21/14* (2013.01); *H02K 47/20* (2013.01); *H02K 11/33* (2016.01); *H02K 29/03* (2013.01)

(56) References Cited

U.S. PATENT DOCUMENTS

| | | | |
|---|---|---|---|
| 4,629,921 A | 12/1986 | Gavaletz | |
| 6,229,239 B1* | 5/2001 | Lucidarme | H02K 1/2706 310/156.53 |
| 6,774,523 B2* | 8/2004 | Ahn | H02K 1/2766 310/156.01 |
| 8,508,092 B2* | 8/2013 | Ankeney | H02K 1/02 310/156.33 |
| 9,083,219 B2* | 7/2015 | Choi | H02K 1/2773 |
| 2002/0047429 A1 | 4/2002 | Kadoya et al. | |
| 2002/0117926 A1 | 8/2002 | Joong et al. | |
| 2005/0225192 A1* | 10/2005 | Kloepzig | H02K 1/2753 310/156.43 |
| 2010/0289365 A1 | 11/2010 | Bando et al. | |
| 2012/0217834 A1 | 8/2012 | Lutz et al. | |
| 2012/0228977 A1 | 9/2012 | Petro et al. | |

FOREIGN PATENT DOCUMENTS

| | | |
|---|---|---|
| CN | 1373548 A | 10/2002 |
| CN | 101897108 A | 11/2010 |
| CN | 202334047 U | 7/2012 |
| EP | 1914872 A1 | 4/2008 |
| EP | 1995855 A2 | 11/2008 |
| EP | 2 214 297 A1 | 8/2010 |
| JP | 2006-187080 A | 7/2006 |
| JP | 2007-318860 A | 12/2007 |
| JP | 2008-312300 A | 12/2008 |
| JP | 2009-118705 A | 5/2009 |
| JP | 2010-70036 A | 4/2010 |
| JP | 2010-183800 A | 8/2010 |
| JP | 2012-95410 A | 5/2012 |
| JP | 2012151989 A | 8/2012 |
| KR | 20120131869 A | 12/2012 |
| WO | WO 2009/060544 A1 | 5/2009 |

OTHER PUBLICATIONS

International Preliminary Report on Patentability Chapter II for PCT/JP2014/004158 completed on Jul. 22, 2015.
International Search Report for PCT/JP2014/004158 dated Sep. 2, 2014.
European Communication pursuant to Article 94(3) EPC for Application No. 14834626.5, dated Aug. 8, 2018.

* cited by examiner

GAB(G1B, 1B)

MBC (M1C)

(B)

JT (A)

JT

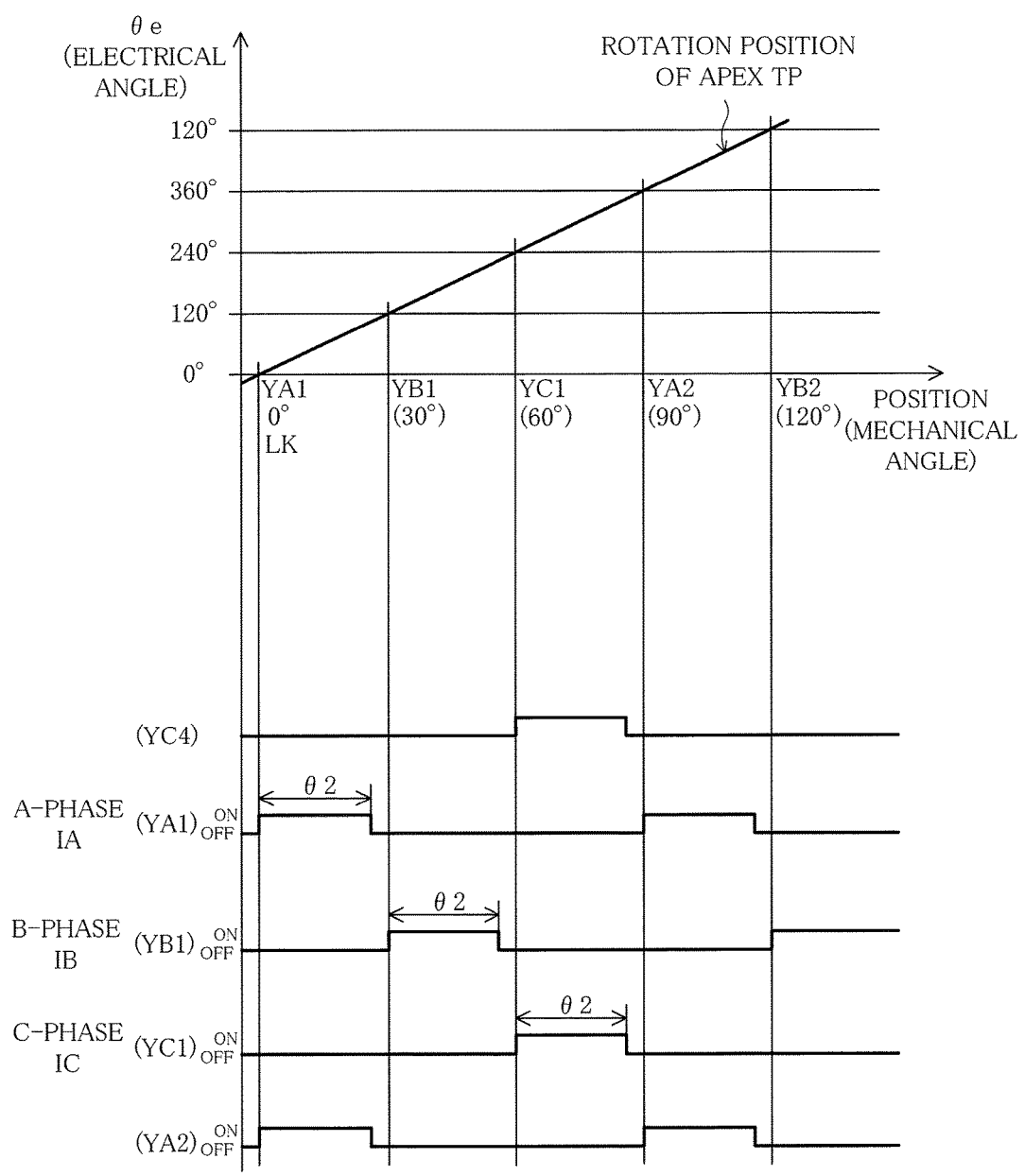

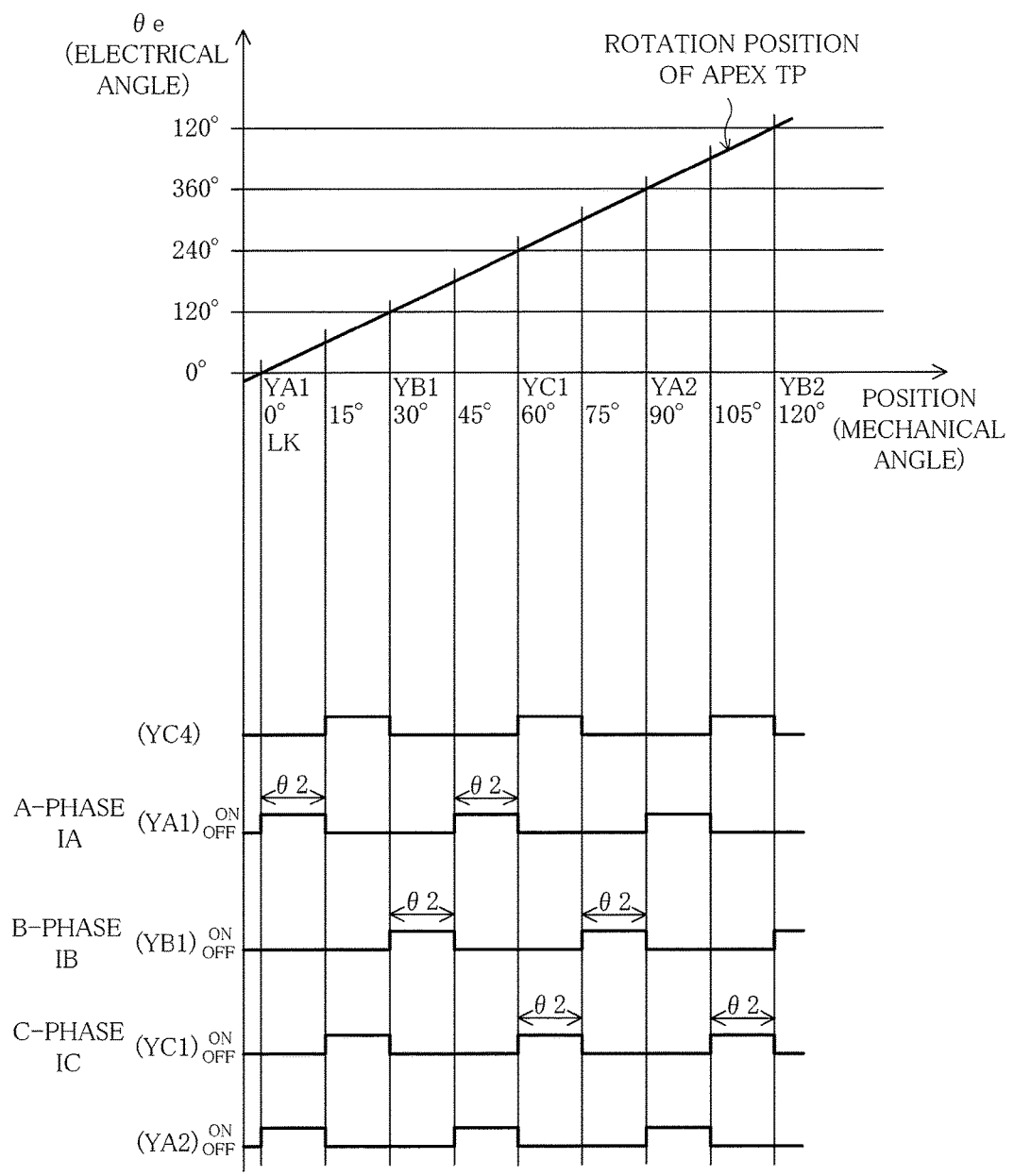

MAGNETIC ROTATING APPARATUS, ELECTRIC MOTOR, AND MOTOR GENERATOR

CROSS-REFERENCE TO RELATED APPLICATIONS

This application is a Continuation of PCT International Application No. PCT/JP2014/004158, filed on Aug. 8, 2014, which claims under 35 U.S.C. 119(a) to Patent Application No. 2013-166694, filed in Japan on Aug. 9, 2013, and under 35 U.S.C. 119(a) to Patent Application No. 2014-160022, filed in Japan on Aug. 6, 2014, all of which are hereby expressly incorporated by reference into the present application.

FIELD

The present invention relates to a magnetic rotating apparatus, an electric motor, and a motor generator.

BACKGROUND

There has conventionally been proposed a magnetic rotating apparatus having a stator in which a plurality of cores with winding are disposed at regular intervals along the circumferential direction and a rotor in which a plurality of permanent magnets are disposed at regular intervals along the circumferential direction and which rotates facing the stator (Japanese Laid-open Patent Publication Nos. 2006-187080 and 2009-118705, and WO 2009/060544).

For example, a magnetic rotating apparatus is disclosed in Japanese Laid-open Patent Publication No. 2006-187080. In the magnetic rotating apparatus, a variety of pulse currents are applied to windings when a rotor is in regions corresponding to different rotational position so that a repulsion force is generated between a permanent magnet and an electromagnet due to a winding.

A magnetic rotating apparatus is disclosed in Japanese Laid-open Patent Publication No. 2009-118705. The magnetic rotating apparatus is provided with a rotor made up of a plurality of permanent magnets disposed in the circumferential direction and a stator made up of a plurality of electromagnets disposed in the circumferential direction. Currents are applied to the electromagnets intermittently; thereby the rotor is rotated with an attraction force and a repulsion force between the permanent magnet and the electromagnet. According to the technique disclosed in Japanese Laid-open Patent Publication No. 2009-118705, the number of permanent magnets and the number of electromagnets are different from each other, so that a detent torque (cogging torque) is reduced.

A one directional electrification-type brushless DC motor is disclosed in WO 2009/060544. The brushless DC motor has a rotor which is rotated to function as a motor, and an AC voltage output winding which generates power directly by the rotation of the rotor.

Such a magnetic rotating apparatus is used to constitute an electric motor or a generator. For example, a rotational torque is developed by an attraction force or repulsion force between a permanent magnet and a magnetic field of a core by a current flowing through a winding, which makes it possible to function the magnetic rotating apparatus as an electric motor. An external rotational force is used to rotate a rotor, and the permanent magnet is rotated to change flux in the core to take out a current from the winding, which makes it possible to function the magnetic rotating apparatus as a generator.

The electric motor and the generator constituted by the magnetic rotating apparatus are coaxially formed to implement a motor generator.

In the magnetic rotating apparatuses disclosed in Japanese Laid-open Patent Publication Nos. 2006-187080 and 2009-118705, however, a large detent torque is caused. This is a factor that lowers the efficiency.

The brushless DC motor disclosed in WO 2009/060544 reduces a detent torque to some extent; however, this is not enough.

Further, when this type of magnetic rotating apparatus starts up as an electric motor, a temporary backlash (reverse rotation) occurs, which sometimes impedes a smooth start-up.

SUMMARY

The present invention has been achieved in light of such a problem, and therefore, an object of an embodiment of the present invention is to provide a magnetic rotating apparatus and a motor generator which are capable of further reducing a detent torque and have high efficiency.

A magnetic rotating apparatus according to an embodiment of the present invention includes: a stator having a plurality of cores with a winding arranged at regular intervals along a circumferential direction; and a rotor which has a plurality of permanent magnets arranged at regular intervals along the circumferential direction and rotates facing the stator, wherein each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference, in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, and in two of the magnet bodies adjacent in the circumferential direction, magnetic poles of counter faces, which are pole faces opposed to the core, of the two permanent magnets close to each other are different from each other.

Preferably, the rotor includes a first rotor and a second rotor, and the first rotor and the second rotor are so disposed that a first phase angle and a second phase angle are different from each other, the first phase angle being a phase angle formed by a center line of each set of the magnet bodies in the first rotor with respect to the core, and the second phase angle being a phase angle formed by a center line of each set of the magnet bodies in the second rotor with respect to the core, each of the center lines passing through a center of rotation.

Preferably, in the first rotor and the second rotor, the first phase angle and the second phase angle are so set that a detent torque caused by an attraction force between the core and the permanent magnet is compensated by the first rotor and the second rotor.

A motor generator according to an embodiment of the present invention includes: an electric motor; a generator;

and a rotary shaft provided common to the electric motor and the generator, wherein each of the electric motor and the generator includes a stator having a plurality of cores with a winding arranged at regular intervals along a circumferential direction, and a rotor which has a plurality of permanent magnets arranged at regular intervals along the circumferential direction and rotates facing the stator, the electric motor and the generator are same in angular interval in arrangement of the plurality of cores in the circumferential direction, and in angular interval in arrangement of the plurality of permanent magnets in the circumferential direction, each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference, in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, in two of the magnet bodies adjacent in the circumferential direction, magnetic poles of the counter faces of the two permanent magnets close to each other are different from each other, and the rotor in the electric motor and the rotor in the generator are coupled to rotate together in a state where a first phase angle and a second phase angle are shifted from each other, the first phase angle being a phase angle formed by a center line of each set of the magnet bodies in the rotor in the electric motor with respect to the core in the stator in the electric motor, and the second phase angle being a phase angle formed by a center line of each set of the magnet bodies in the rotor in the generator with respect to the core in the stator in the generator, each of the center lines passing through a center of rotation.

A motor generator according to another embodiment of the present invention includes, in two of the magnet bodies adjacent in the circumferential direction, magnetic poles of the counter faces of the two permanent magnets close to each other are the same as each other in the rotor of the generator.

Preferably, in a free state, the rotor stops in a state where at least a part of at least one of the counter faces in each of the magnet bodies is opposed to an end face of the core.

According to the present invention, it is possible to provide a magnetic rotating apparatus and a motor generator which are capable of further reducing a detent torque and have high efficiency.

BRIEF DESCRIPTION OF DRAWINGS

FIG. 20 is a timing chart showing how a control unit controls an electric motor according to the third embodiment; and FIG. 21 is a timing chart showing how a control unit controls an electric motor according to the fourth embodiment.

DESCRIPTION OF EMBODIMENTS

Figure 1:
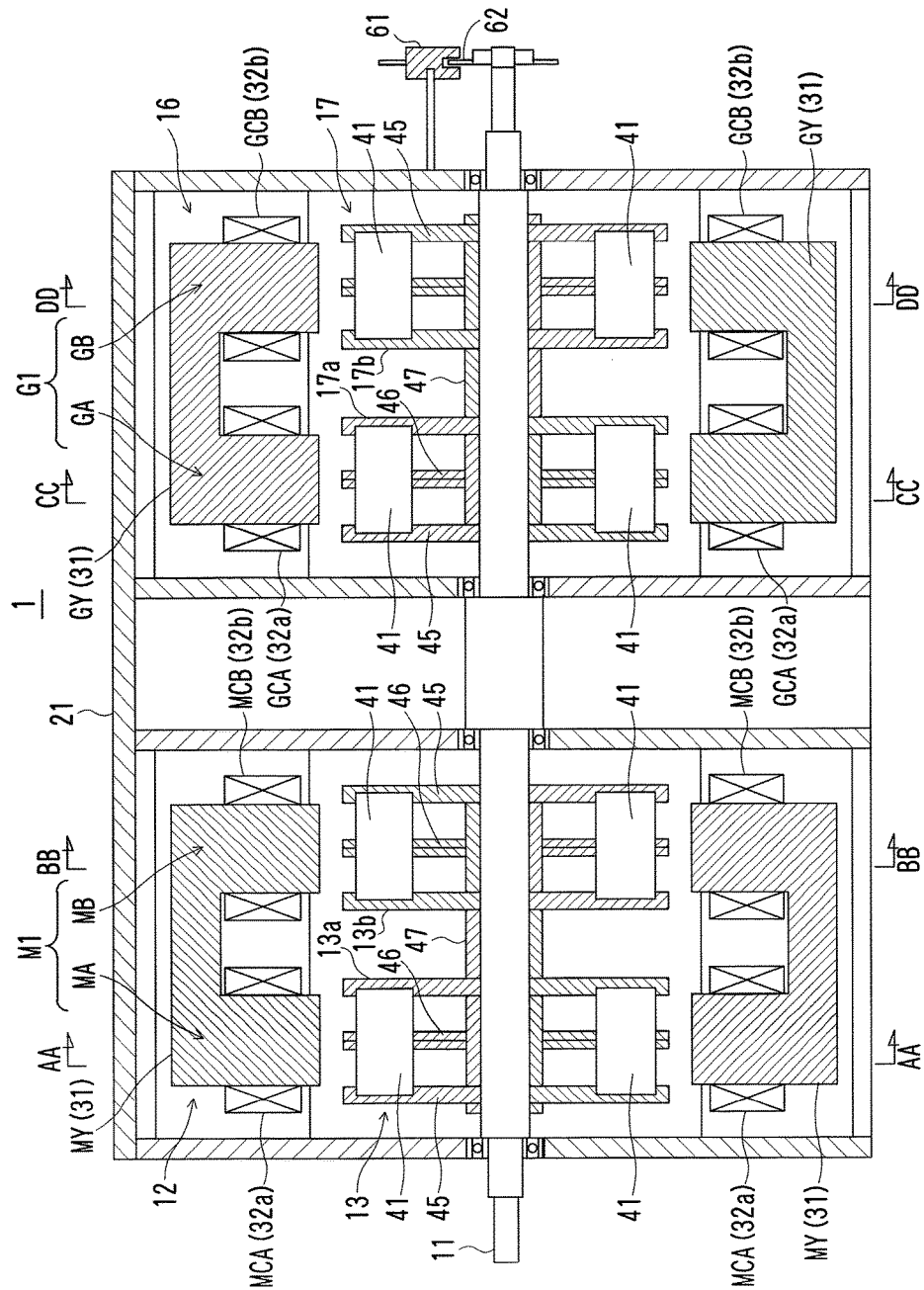
FIG. 1 is a sectional side view of a motor generator according to an embodiment of the present invention.
Figure 2:
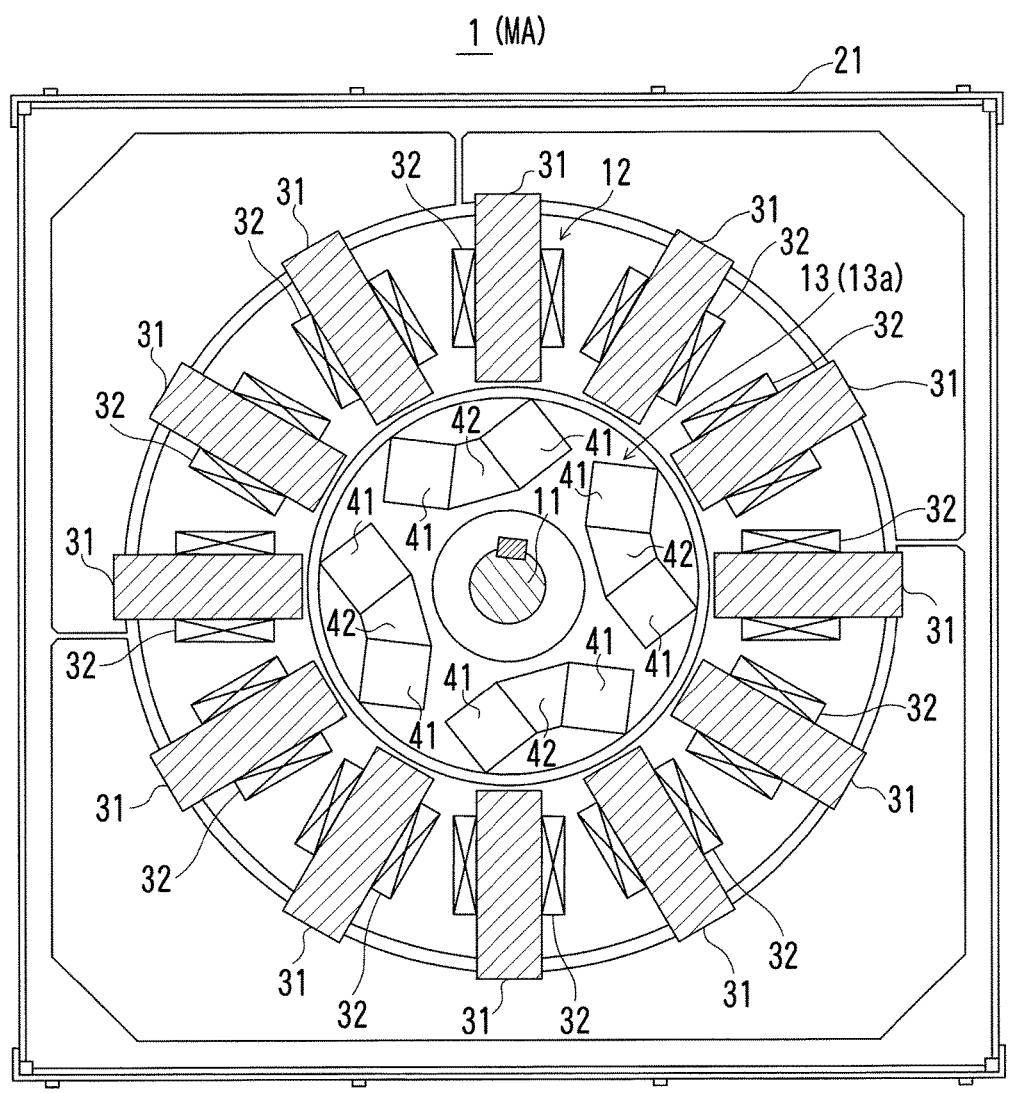
FIG. 2 is a sectional front view of the motor generator shown in FIG. 1.
Figure 3:
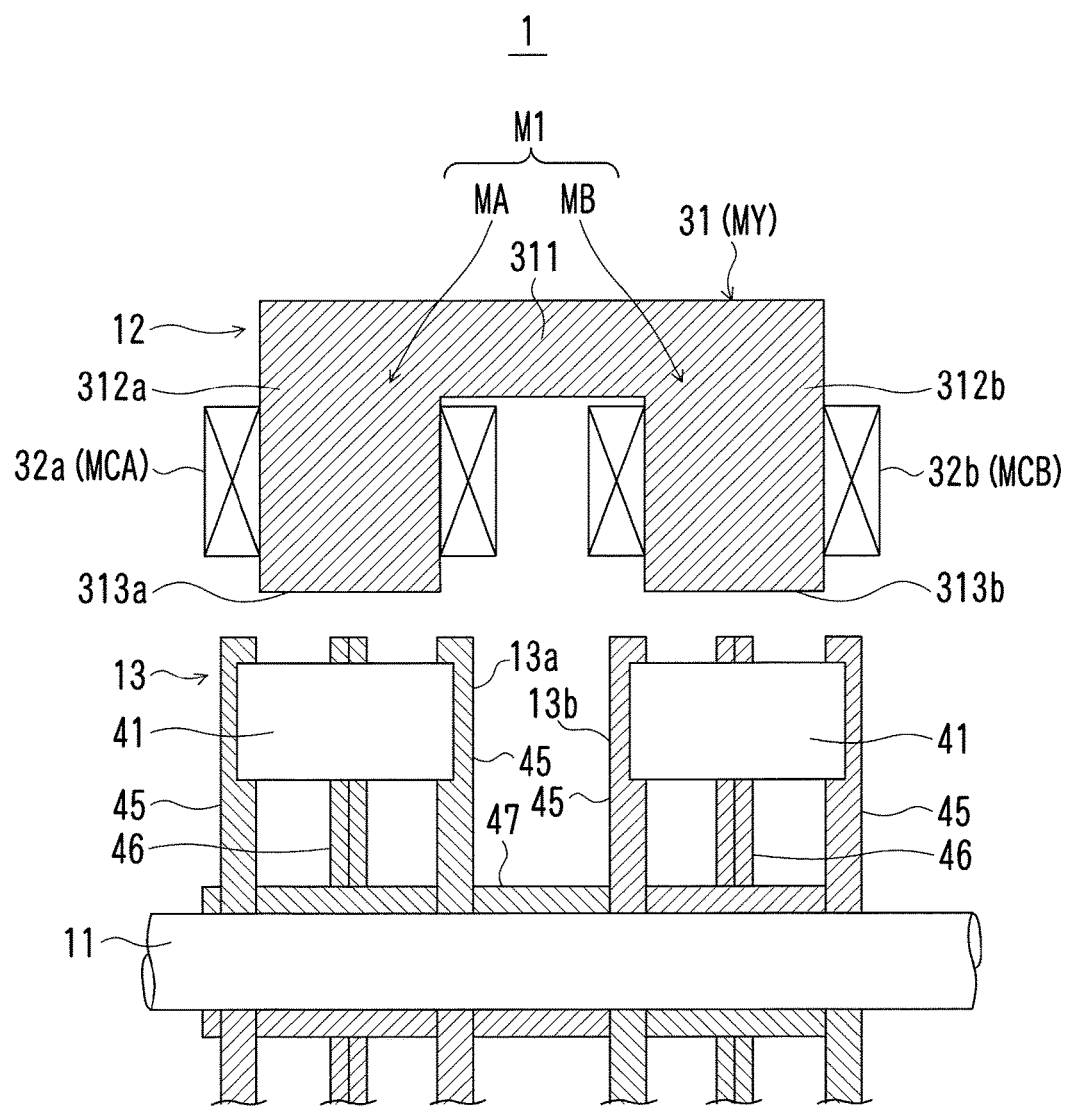
FIG. 3 is a partial enlarged view of FIG. 1.
Figure 4:
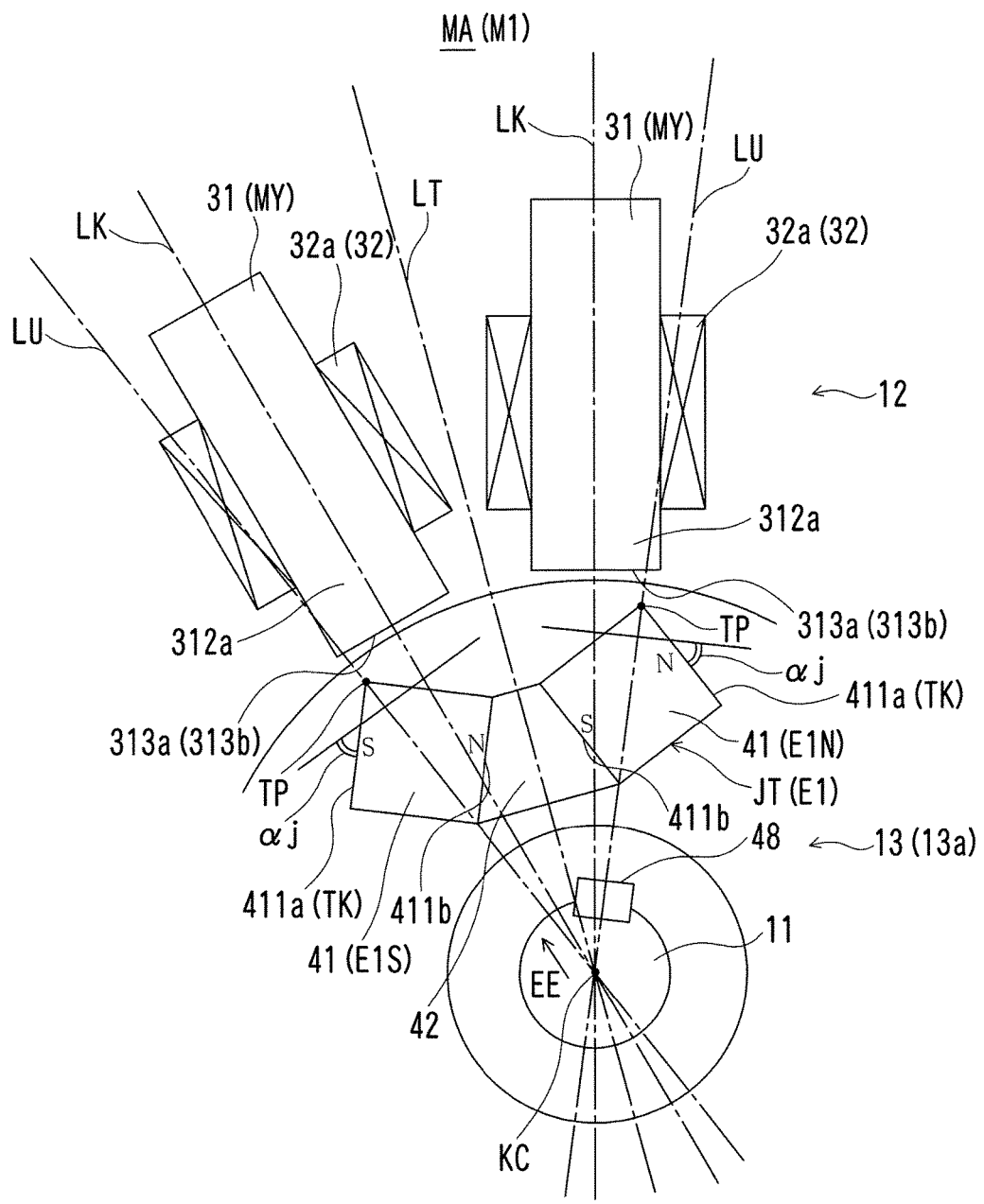
FIG. 4 is a partial enlarged view of FIG. 2.
Figure 5:
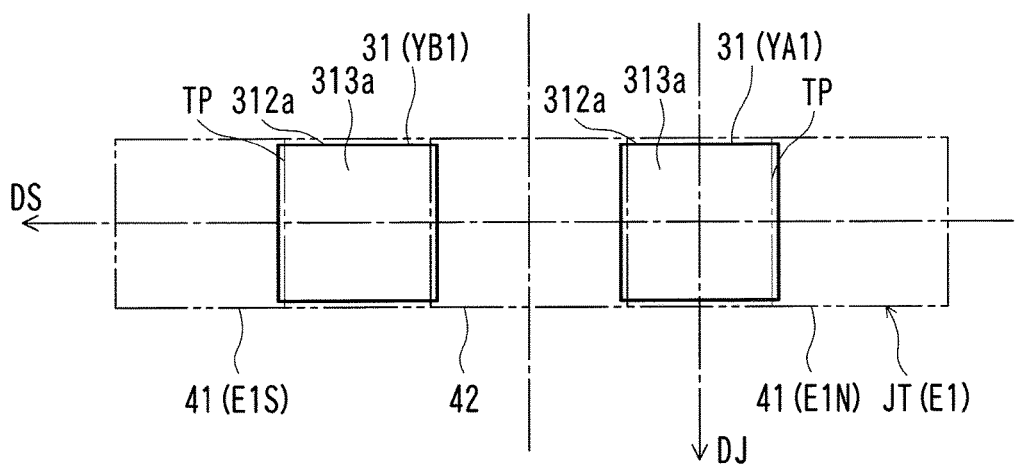
FIG. 5 is a development of FIG. 4 as viewed from the arrow EE.

FIGS. 1 and 2 are a sectional side view and a sectional front view of a motor generator 1 according to an embodiment of the present invention, respectively. FIGS. 3 and 4 are partial enlarged views of FIGS. 1 and 2, respectively. FIG. 5 is a diagram of FIG. 4 as viewed from the arrow EE. FIG. 2 corresponds to a sectional view of the motor generator 1 taken along the line AA-AA of FIG. 1. FIG. 5 is a development of FIG. 4 when an end face of a core is viewed from the center of rotation of the rotary shaft. In FIG. 5, the circumferential direction is denoted by an arrow DS and the axial direction is denoted by an arrow DJ.

FIGS. 1-5 are intended to show how a stator, a rotor, a core, a permanent magnet, and a magnet body are arranged. FIGS. 1-5 therefore do not precisely show the mechanical architecture for supporting various members such as the stator and the rotor of the motor generator 1 and the connection relationship therebetween.

Referring to FIGS. 1-5, the motor generator 1 is provided with an electric motor M1 and a generator G1. The motor generator 1 also has a rotary shaft 11 which is provided common to the electric motor M1 and the generator G1. In this description, the terms of an "electric motor M" and a "generator G" are sometimes used to represent electric motors and generators respectively of all embodiments.

A frame 21 is made of a non-magnetic material, for example, stainless steel. The frame 21 is provided to mechanically maintain the electric motor M1 and the generator G1, and forms the outer shape of the motor generator 1.

The rotary shaft 11 is supported by a bearing provided in the frame 21 so as to be rotatably supported with respect to the frame 21.

The electric motor M1 includes two parts of an A-electric motor MA and a B-electric motor MB. The generator G1 includes two parts of an A-generator GA and a B-generator GB.

In this embodiment, the electric motor M1 and the generator G1 are the same in basic structure. For example, the electric motor M1 and the generator G1 are the same in: angular position and angular interval in arrangement of cores 31 in the circumferential direction; and angular position and angular interval in arrangement of permanent magnets 41 in the circumferential direction.

In short, in the embodiments herein, there is little difference between the electric motor M1 and the generator G1 in shape and size of the core 31 and the permanent magnet 41. Further, there are no phase difference between the electric motor M1 and the generator G1 in arrangement of members thereof. In the electric motor M1 and the generator G1, the same member is disposed at the same angular position in the circumferential direction, namely, in the rotational direction.

However, there are differences between the electric motor M1 and the generator G1 in polarity of a magnetic pole of the permanent magnet 41, in structure of a magnet body JT, phase angle of arrangement of the magnet body JT, and so on. The details thereof are provided below.

First, the structure of the motor generator 1 and arrangement of members thereof are described. Second, the polarities of the permanent magnet 41 and the magnet body JT, a phase relationship of the angular position of the magnet body JT, and so on are described.

[Explanation of Structure of Motor Generator]

<Electric Motor>

The electric motor M1 includes the rotary shaft 11, a stator 12, a rotor 13, and the frame 21.

<Stator>

The stator 12 has cores 31 arranged at regular intervals in the circumferential direction. Each of the cores 31 has a winding (coil) 32. The core 31 provided in the electric motor M1 is sometimes referred to as a "core MY". The core 31 provided in the generator G1 is sometimes referred to as a "core GY".

Each of the cores 31 is formed by laminating silicon steel sheets having a horizontal U-shape or a U-shape to a predetermined thickness. Each of the cores 31 has a drum 311 on its middle part, and legs 312a and 312b on both ends of the drum 311. The legs 312a and 312b have, on their ends, end faces 313a and 313b having a rectangular shape, respectively. The end faces 313a and 313b are provided on one plane and are oriented toward the center of the rotary shaft 11.

The winding 32 has two windings 32a and 32b provided in the legs 312a and 312b of the core 31, respectively. Currents are applied to the windings 32a and 32b to produce a magnetic flux and magnetic field in the core 31, so that the core 31 turns into an electromagnet. The two windings 32a and 32b are connected to each other, for example, in parallel, and currents are so applied that a magnetic flux is produced in the same direction in the core 31. This provides different magnetic poles in the end faces 313a and 313b. To be specific, one of the end faces 313a and 313b functions as the N-pole, and the other functions as the S-pole.

In this embodiment, the twelve cores 31 are arranged in a circle at regular intervals in such a manner that each of the drums 311 extends in parallel with the axial direction, in other words, the two legs 312a and 312b of each of the cores 31 are disposed distantly along the axial direction. To be specific, the twelve cores 31 are so arranged that the central angle formed by the adjacent cores 31 is set at 30 degrees (=360÷12).

Stated differently, a center line LK passing through the center of the core 31 and the center of the stator 12, namely, the center of rotation (axis of the rotary shaft 11) of the rotor 13 form a central angle of 30 degrees with respect to an adjacent center line LK. A gap between an end face of the core 31 and an end face of the adjacent core 31 is almost equal to or slightly smaller than a width of the end face.

The rotor 13 has an A-rotor 13a opposed to the leg 312a of the core 31, and a B-rotor 13b opposed to the leg 312b. The A-rotor 13a and the B-rotor 13b rotate together, and basically have the same structure as each other. Therefore, only the A-rotor 13a is detailed below. As for the B-rotor 13b, differences from the A-rotor 13a are mainly described.

The A-rotor 13a and a part of the leg 312a of the rotor 13 constitute the A-electric motor MA. The B-rotor 13b and a part of the leg 312b of the rotor 13 constitute the B-electric motor MB.

<A-Rotor>

The A-rotor 13a has permanent magnets 41 arranged at regular intervals along the circumferential direction. The A-rotor 13a rotates facing the stator 12, specifically, facing the end face 313a of the leg 312a together with the rotary shaft 11.

In this embodiment, the eight permanent magnets 41 are arranged in a circle at regular intervals. To be specific, the permanent magnets 41 are so arranged that the central angle formed by the adjacent permanent magnets 41 is set at 45 degrees (=360÷8).

The permanent magnet 41 is a magnet containing neodymium as a component (neodymium magnet). The permanent magnet 41 is generally formed to have a parallelepiped shape, namely, a block shape. Two surfaces of the parallelepiped facing each other are pole faces 411a and 411b. One of the pole faces 411a and 411b functions as the N-pole, and the other functions as the S-pole.

Of the two pole faces 411a and 411b, a surface facing the core 31 is set to be the pole face 411a, and the other surface is set to be the pole face 411b. The pole face 411a facing the core 31 is sometimes referred to as a "counter face" or a "counter face TK".

The permanent magnet 41 is so disposed that a counter face TK has an inclination angle αj with respect to the tangential direction of the circumference.

Two permanent magnets 41 adjacent to each other in the circumferential direction constitute a set of magnet bodies JT. To be specific, eight permanent magnets 41 constitute four sets of magnet bodies JT. The four sets of magnet bodies JT are disposed in a circle at regular intervals. To be more specific, the four sets of magnet bodies JT are disposed in such a manner that the central angle formed by the adjacent magnet bodies JT is set at 90 degrees (=360÷4).

With each set of magnet bodies JT, the two permanent magnets 41 are so disposed that the two counter faces TK have magnetic poles different from each other. In addition, the two counter faces TK of the magnet body JT are so disposed that inclinations with respect to the tangential direction of the circumference are reverse to each other, in other words, disposed that inclination angles αj are formed in directions opposite to each other.

In this embodiment, the inclination angle αj is approximately 45 degrees. The permanent magnet 41 is a cube having a side of approximately 25 mm. The size of each of the end faces 313a and 313b of the core 31 is almost the same as the length of the side of the permanent magnet 41 longitudinally (in the axial direction) and horizontally (in the circumferential direction).

A joint member 42 made of a magnetic material is disposed between the two pole faces 411b of the two permanent magnets 41. The joint member 42 has a front shape of trapezoid (see FIG. 4). The inclined surfaces of the joint member 42 contact the pole faces 411b of the two permanent magnets 41. The magnetic force of the permanent magnets 41 attract the joint member 42, so that the joint member 42 is integral with the permanent magnets 41. Thereby, the entirety of the magnet body JT functions as one permanent magnet. At both ends of the magnet body JT, the two pole faces 411a inclined radially outward, i.e., counter faces TK, are formed.

The magnet body JT is symmetrical with respect to a line passing through the center of the joint member 42, namely, center line LT. The center line LT is the center line of the magnet body JT. To be specific, the center line LT passes through the center of rotation of the magnet body JT, namely, through the center of rotation KC of the rotor 13.

FIG. 4 also shows a part of the permanent magnet 41 which is closest to the core 31, specifically, a line (magnetic pole line) LU passing through an apex TP which is a corner of the counter face TK and also passing through the center of rotation KC. In the case where the permanent magnet 41 is a cube and the inclination angle αj is 45 degrees, the magnetic pole line LU corresponds to the diagonal line of the permanent magnet 41.

As described above, the central angle by the two neighboring magnetic pole lines LU, i.e., the angle of center lines passing through apexes TP which are corners of the two counter faces TK of the magnet body JT, is 45 degrees.

In the embodiments, each of the permanent magnets 41 is provided in the form of one permanent magnet. Instead of this, however, each of the permanent magnets 41 may be provided in the form of a plurality of permanent magnets. For example, a plurality of permanent magnets each of which has a plate-shape or parallelepiped-shape are laminated with one another to form one permanent magnet 41.

The joint member 42 may have a structure in which trapezoid joint members having the same inclination and different base lengths may be stacked in vaulting boxes shape. Alternatively, as described later, the entirety of the magnet body JT may be constituted of one permanent magnet.

In order to support the permanent magnets 41, the joint members 42, and the magnet bodies JT, and to couple the permanent magnets 41, the joint members 42, and the magnet bodies JT to rotate together with the rotary shaft 11, a side plate member 45, an intermediate member 46, and so on are provided.

The side plate members 45 are disk-like members with a concave portion to sandwich each of the permanent magnets 41 and the joint member 42 therebetween from both sides in the axial direction and to position the permanent magnets 41 and the joint member 42. The intermediate members 46 are disk-like members with a hole into which each of the permanent magnets 41 and the joint member 42 are penetrated and to support the center of each of the permanent magnets 41 and the joint member 42 in the axial direction.

The side plate member 45 and the intermediate member 46 are non-magnetic members, and are made of synthetic resin which is an insulator.

The side plate member 45 and the intermediate member 46 are fixed to a cylindrical bush 47 into which the rotary shaft 11 is penetrated. The bush 47 rotates together with the rotary shaft 11 by a key 48.

The material and shape of the side plate member 45 and the intermediate member 46 may be a material and shape other than those described above.

<B-Rotor>

The description goes on to the B-rotor 13b.

The structure of the B-rotor 13b is basically the same as that of the A-rotor 13a. The B-rotor 13b differs from the A-rotor 13a in polarity of the counter face TK.

To be specific, the B-rotor 13b, namely, a part of the rotor which is opposed to the leg 312b of the core 31, has permanent magnets 41 arranged at regular intervals in the circumferential direction, as with the case of the A-rotor 13a. The B-rotor 13b rotates together with the rotary shaft 11 while facing the stator 12, specifically, the end face 313b of the leg 312b.

As the A-rotor 13a and the B-rotor 13b are viewed from the front, i.e., from the direction along the rotary shaft 11, the permanent magnets 41 and the magnet bodies JT are aligned with each other to be disposed on the same line. Therefore, the center line LT of the A-rotor 13a corresponds to the center line LT of the B-rotor 13b, and both the center lines LT overlap each other.

In short, there is no phase difference between the A-rotor 13a and the B-rotor 13b in layout of the permanent magnets 41 and the magnet bodies JT. To be specific, in the A-rotor 13a and the B-rotor 13b, the same member is disposed at the same angular position in the circumferential direction, namely, in the rotational direction.

The A-rotor 13a and the B-rotor 13b are, however, different from (namely, opposite to) each other in polarity of the magnetic pole in the permanent magnet 41.

To be specific, the polarity of the magnetic pole in the end face 313a of the core 31 is different from (namely, opposite to) that of the magnetic pole in the end face 313b. Therefore, the polarity of the magnetic pole in the permanent magnet 41 is different between the A-rotor 13a and the B-rotor 13b. For example, when the counter face TK of the A-rotor 13a is the N-pole, the counter face TK of the B-rotor 13b is the S-pole.

The polarity of the counter face TK and so on are detailed later.

The side plate member 45 and the intermediate member 46 of the B-rotor 13b are fixed to the bush 47 which is used in common with the A-rotor 13a. This enables positioning the A-rotor 13a and the B-rotor 13b in the circumferential direction with respect to each other, so that the A-rotor 13a and the B-rotor 13b rotate together.

<Generator>

The description goes on to the generator G1.

As described above, the generator G1 has a structure which is basically the same as that of the electric motor M1.

To be specific, the generator G1 includes the rotary shaft 11, a stator 16, a rotor 17, and the frame 21. The rotary shaft 11 and the frame 21 are common in the entirety of the motor generator 1.

As with the stator 12 of the electric motor M1, the stator 16 has twelve cores 31 arranged at regular intervals in a circle. In other words, the twelve cores 31 are so arranged that the central angle formed by the adjacent cores 31 is set at 30 degrees.

The rotor 17 has an A-rotor 17a opposed to the leg 312a of the core 31 of the stator 16, and a B-rotor 17b opposed to the leg 312b, which is basically the same as the rotor 13 of the electric motor M1. The A-rotor 17a and the B-rotor 17b rotate together, and are basically the same in structure.

Rotation angular positions of the rotors 13 and 17 shown in FIGS. 1-5 are examples in a state where the rotation thereof stops.

The rotor 13 of the electric motor M1 is an example of a "first rotor" recited in the present invention. The rotor 17 of the generator G1 is an example of a "second rotor" recited in the present invention.

In the motor generator 1 described with reference to FIGS. 1-5, the number of cores 31 and layout thereof, the number of permanent magnets 41 and layout thereof, the structure and layout of the magnet bodies JT may be changed in various ways.

<Explanation of Polarity of Permanent Magnet>

First Embodiment: 8-Pole Electric Motor—8-Pole Generator

FIGS. 6, 7, 8, and 9 show, as the first embodiment, show sectional views taken along the line AA-AA, the line BB-BB, the line CC-CC, and the line DD-DD for the case where the magnetic poles by the magnet bodies JT of the rotors 13 and 17 are 8 poles.

Figure 6:
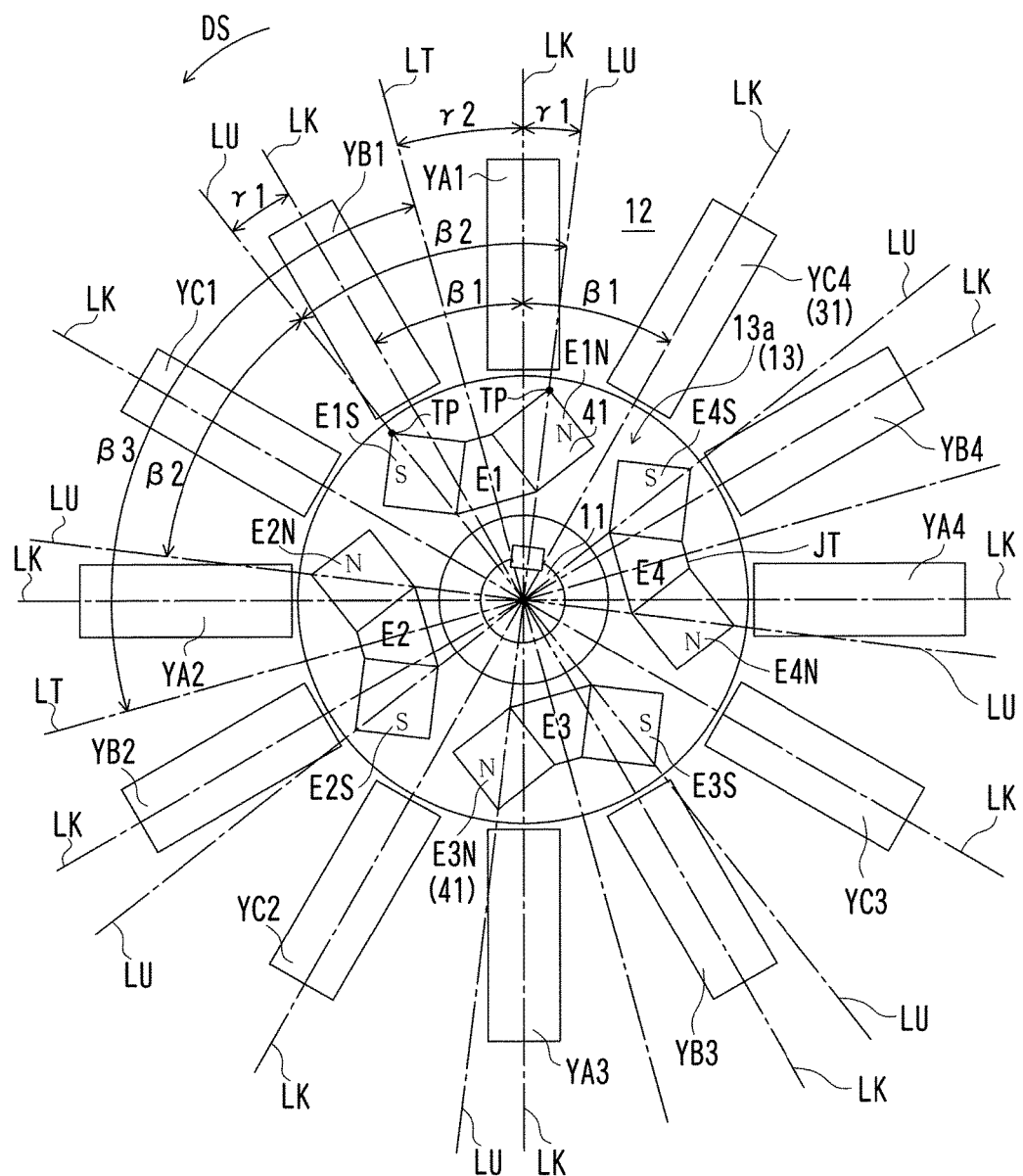
FIG. 6 is a diagram showing polarities of magnet bodies in an A-electric motor of an 8-pole electric motor according to a first embodiment.
Figure 7:
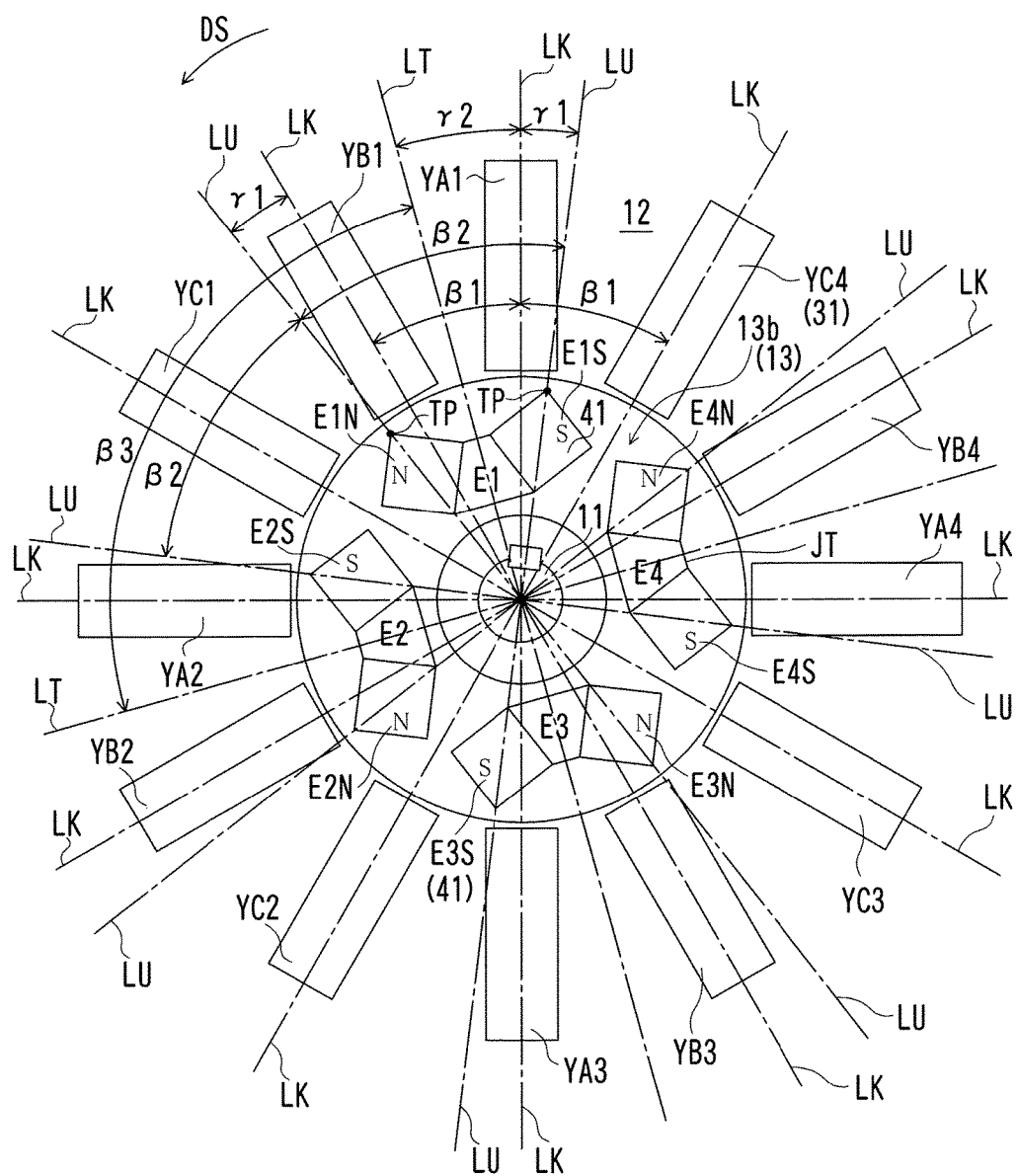
FIG. 7 is a diagram showing polarities of magnet bodies in a B-electric motor of the 8-pole electric motor according to the first embodiment.
Figure 8:
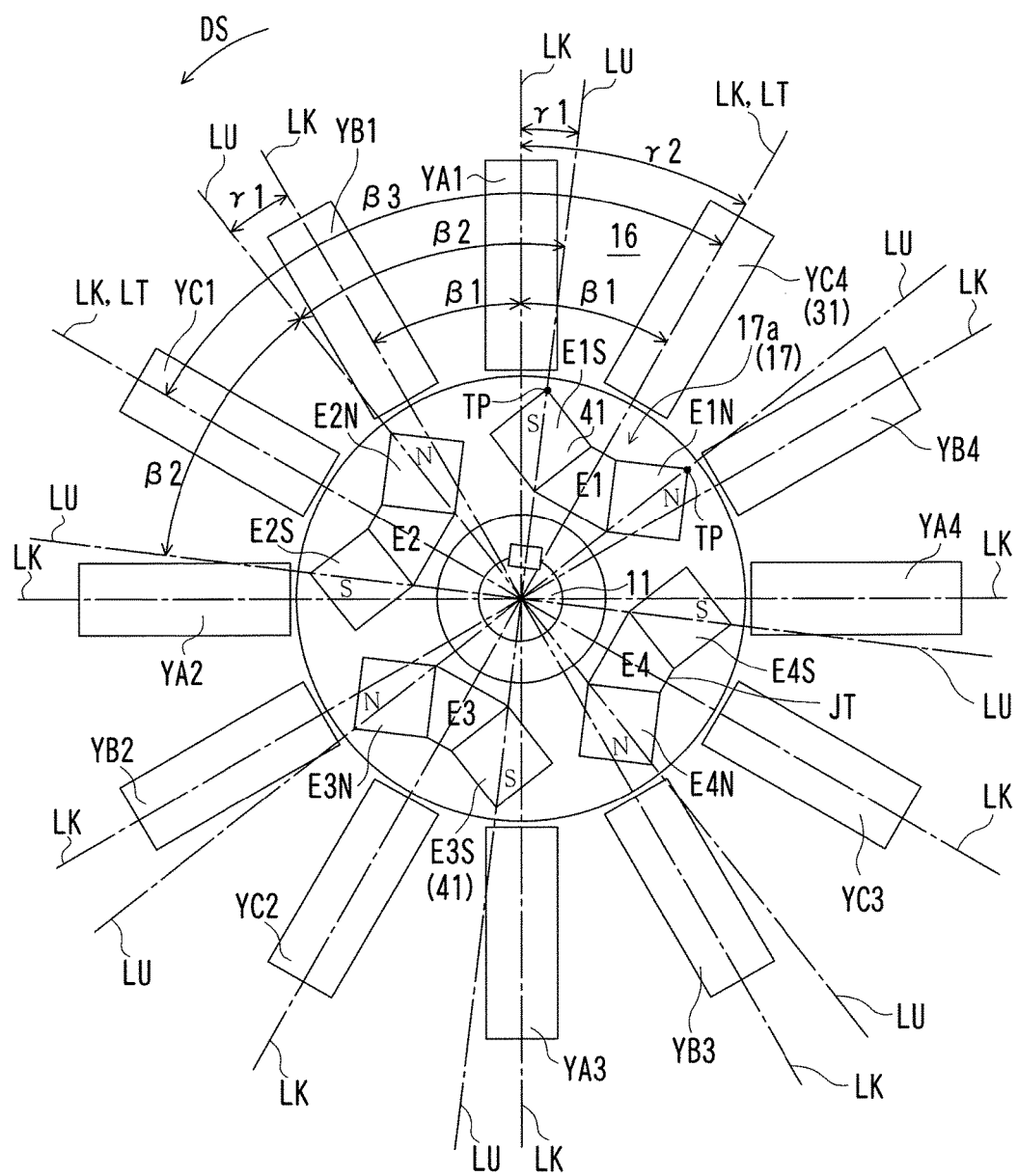
FIG. 8 is a diagram showing polarities of magnet bodies in an A-generator of an 8-pole generator according to the first embodiment.
Figure 9:
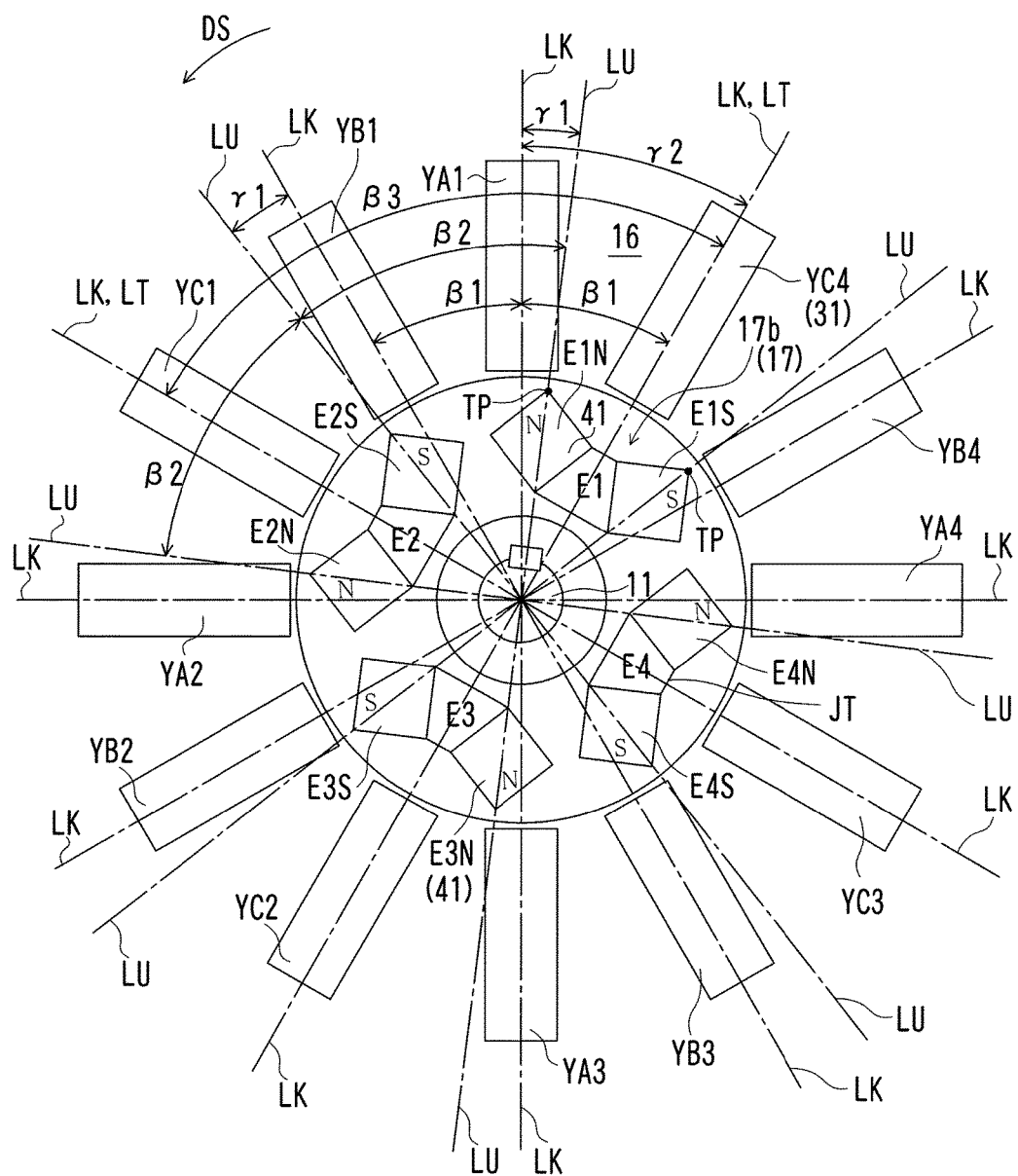
FIG. 9 is a diagram showing polarities of magnet bodies in a B-generator of the 8-pole generator according to the first embodiment.

To be specific, FIG. 6 shows polarities of magnetic poles in the A-rotor 13a of the electric motor M1. FIG. 7 shows polarities of magnetic poles in the B-rotor 13b of the electric motor M1. FIG. 8 shows polarities of magnetic poles in the A-rotor 17a of the generator G1. FIG. 9 shows polarities of magnetic poles in the B-rotor 17b of the generator G1. FIGS. 6-9 show states of rotation angular position of the A-rotor 13a, the B-rotor 13b, the A-rotor 17a, and the B-rotor 17b, respectively at the same hour. The A-rotor 13a, the B-rotor 13b, the A-rotor 17a, and the B-rotor 17b rotate at the same time with the relative positional relationship maintained in the circumferential direction.

FIGS. 6-9 show cases where the stators 12 and 16 have twelve cores 31 disposed at regular intervals.

FIGS. 6-9 are provided to mainly explain the polarities of the magnetic poles and the rotation angular positions. The detailed illustration of the structure and the like is omitted in FIGS. 6-9.

Referring to FIG. 6, the center lines LK of the twelve cores 31 make central angles of β1 (=30 degrees) with the individual adjacent center lines LK. The magnetic pole lines LU indicating the positions of the eight permanent magnets 41 make central angles of β2 (=45 degrees) with the individual adjacent magnetic pole lines LU. The center lines LT of the magnet bodies JT make central angles of β3 (=90 degrees) with the individual adjacent center lines LT.

FIGS. 2, 4, 5, and 6-9, show a state of a possible rotation angular position by the rotors 13 and 17 in a free state where no current flows in the windings 32 and no external rotational force is given to the rotary shaft 11.

In the states shown in the drawings, each of the apexes TP of the permanent magnets 41 is positioned very close to an edge of the end face 313a of the core 31. In the electric motor M1, two apexes TP of the magnet body JT are very close to distant edges of two end faces 313a of the cores 31 adjacent to each other. In the generator G1, two apexes TP of the magnet body JT are very close to nearby edges of two end faces 313a of two cores 31 disposed with one core 31 interposed therebetween. Stated differently, in the generator G1, the counter face TK of the magnet body JT faces the end face 313a of the core 31.

In this state of the generator G1, a large attraction force acts between each of the magnet bodies JT and the core 31, and a large attraction force acts between the four sets of the magnet bodies JT and the cores 31. As described later, positions at which the rotors 13 and 17 stop in the free state depend on the magnitude of the collective attraction forces between the cores 31 and the magnet bodies JT of the rotors 13 and 17.

In the meantime, referring to FIGS. 6-9, reference signs are given to identify the twelve cores 31, the eight permanent magnets 41, and the four magnet bodies JT.

Supposing that three cores 31 successively adjacent to one another in the circumferential direction make a set of core groups, four sets of core groups are made. For each set of core groups, the three cores 31 are set at an A-phase, B-phase, and C-phase in the stated order of the counter-clockwise direction of FIGS. 6-9.

The core 31 shown at the top of FIGS. 6-9 is identified as "YA1". In the counter-clockwise direction from the top core 31, the cores 31 are referred to as "YB1", "YC1", "YA2", "YB2", "YC2", "YA3", "YB3", "YC3", "YA4", "YB4", and "YC4". The "Y" of the reference sign represents "core".

As to the magnet bodies JT, the magnet body JT shown at the top of FIGS. 6-9 is identified as "E1". In the counter-clockwise direction from the top magnet body JT, the magnet bodies JT are referred to as "E2", "E3", and "E4".

The permanent magnets 41 are referred to as "E1N", "E1S", "E2N", "E2S", "E3N", "E3S", "E4N", and "E4S" by adding the polarities of the counter faces TK to the reference signs of the individual magnet bodies JT.

The winding 32 provided in the A-electric motor MA is sometimes referred to as "MCA". The windings 32 provided in the B-electric motor MB, the A-generator GA, and the B-generator GB are sometimes referred to as "MCB", "GCA", and "GCB", respectively.

The winding 32 wound around the core 31 called "YA1" is sometimes referred to as "CA1". The winding 32 wound around the core 31 called "YB1" is sometimes referred to as "CB1".

In each of FIGS. 6-9, the eight permanent magnets 41 are so disposed that N-poles and S-poles are arranged alternately in the counter faces TK of the permanent magnets 41. The polarities of the A-rotor 13a in FIG. 6 are opposite to those of the B-rotor 13b in FIG. 7. The polarities of the A-rotor 17a in FIG. 8 are opposite to those of the B-rotor 17b in FIG. 9.

In the A-rotor 13a and the B-rotor 13b of the electric motor M1 of FIGS. 6 and 7, respectively, magnetic poles of the counter faces TK of two permanent magnets 41 close to each other in two magnet bodies JT (E1-E4) which are adjacent to each other in the circumferential direction are different from each other.

To be specific, referring to the A-rotor 13a of FIG. 6, in the two magnet bodies E1 and E2 adjacent to each other in the circumferential direction, the magnetic poles of the counter faces TK of two permanent magnets E1S and E2N close to each other are different from each other, namely, the S-pole and the N-pole respectively. In the two magnet bodies E1 and E4, the magnetic poles of the counter faces TK of two permanent magnets E1N and E4S are different from each other, namely, the N-pole and the 5-pole respectively.

Referring to the B-rotor 13b of FIG. 7, in the two magnet bodies E1 and E2 adjacent to each other in the circumferential direction, the magnetic poles of the counter faces TK of two permanent magnets E1N and E2S close to each other are different from each other, namely, the N-pole and the S-pole respectively. In the two magnet bodies E1 and E4, the magnetic poles of the counter faces TK of two permanent magnets E1S and E4N are different from each other, namely, the S-pole and the N-pole respectively.

In each of the A-rotor 13a and the B-rotor 13b, the eight permanent magnets 41 form the eight magnetic poles at the same positions in the A-rotor 13a and the B-rotor 13b, which means 8-pole.

The magnet body E1 is referred to, which faces the core YA1 shown at the top of FIGS. 6 and 7. The central angle formed by the center line LK of the core YA1 and the center line LT of the magnet body E1 is γ2 in each of FIGS. 6 and 7. Herein, γ2 is calculated by the following equation.

$$\gamma 2 = (\beta 2 / 2) - \gamma 1$$
$$= (\beta 1 / 2)$$

wherein β1=30 degrees, and β2=45 degrees. Thus, γ1 is 7.5 degrees, and γ2 is 15 degrees.

To be specific, when the electric motor M1 is in the free state, the position of the permanent magnet 41 facing the core 31, i.e., the position of the magnetic pole line LU, is shifted from the center line LK of the core 31 by γ1, namely, by 7.5 degrees.

The permanent magnet 41 on the right of the magnet body JT is shifted, by 7.5 degrees, to the right (minus side) from the center line LK of the core 31. The permanent magnet 41 on the left of the magnet body JT is shifted, by 7.5 degrees, to the left (plus side) from the center line LK of the core 31.

When the electric motor M1 is in the free state, the position of the center line LT of the magnet body JT facing the core 31 is shifted from the center line LK of the core 31 by γ2, namely, by 15 degrees. In short, the magnet body JT is provided at the middle position between the center lines LT of the two cores 31.

In the A-rotor 17a and the B-rotor 17b of the generator G1 of FIGS. 8 and 9, respectively, magnetic poles of the counter faces TK of two permanent magnets 41 close to each other in two magnet bodies JT (E1-E4) which are adjacent to each other in the circumferential direction are different from each other.

To be specific, referring to the A-rotor 17a of FIG. 8, in the two magnet bodies E1 and E2 adjacent to each other in the circumferential direction, the magnetic poles of the counter faces TK of two permanent magnets E1S and E2N close to each other are different from each other, namely, the S-pole and the N-pole respectively. In the magnet bodies E1 and E4, the magnetic poles of the counter faces TK of two permanent magnets E1N and E4S are different from each other, namely, the N-pole and the S-pole respectively.

Referring to the B-rotor 17b of FIG. 9, in the two magnet bodies E1 and E2 adjacent to each other in the circumferential direction, the magnetic poles of the counter faces TK of two permanent magnets E1N and E2S close to each other are different from each other, namely, the N-pole and the S-pole respectively. In the magnet bodies E1 and E4, the magnetic poles of the counter faces TK of two permanent magnets E1S and E4N are different from each other, namely, the S-pole and the N-pole respectively.

In each of the A-rotor 17a and the B-rotor 17b, the eight permanent magnets 41 form the eight magnetic poles at the same positions in the A-rotor 17a and the B-rotor 17b, which means 8-pole.

The magnet body E1 is referred to, which faces the core YA1 shown at the top of FIGS. 8 and 9. The central angle formed by the center line LK of the core YA1 and the center line LT of the magnet body E1 is γ2 in each of FIGS. 8 and 9. Herein, γ2 is calculated by the following equation.

$$\gamma 2 = \beta 1$$

In short, the center line LT of the magnet body E1 corresponds to the center line LK of the next core YC4. As described above, since β1 is 30 degrees, γ2 is also 30 degrees.

Thus, as shown in FIGS. 8 and 9, when the generator G1 is in the free state, the center line LT of the magnet body JT opposed to the core 31 corresponds to the center line LK of the core 31 which is positioned between the two cores 31 opposed to the two permanent magnets 41.

The position of the magnetic pole line LU is shifted from the center line LK by γ1, namely, by 7.5 degrees, which is the same as that discussed earlier.

<Phase Relationship of Rotation Position Between Rotor of Electric Motor and Rotor of Generator>

The description goes on to the phase relationship of rotation angular position between the rotor 13 of the electric motor M1 and the rotor 17 of the generator G1.

In the electric motor M1 and the generator G1, the rotor 13 and the rotor 17, respectively, rotate together with respect to the cores 31 which are disposed in the same angular position in the electric motor M1 and the generator G. Therefore, even during the rotation, the difference in central angles γ1 and γ2 between the rotor 13 of the electric motor M1 and the rotor 17 of the generator G is always maintained. The central angles γ1 and γ2 show the central angles in states of FIGS. 6-9. The central angles denoted by γ1 and γ2 are sometimes referred to as "phase angles".

The central angles (phase angles) γ1 and γ2 of the electric motor M1 are referred to as central angles (phase angles) γ1M and γ2M. The central angles (phase angles) γ1 and γ2 of the generator G1 are referred to as central angles (phase angles) γ1G and γ2G. This is to distinguish between the central angles (phase angles) γ1 and γ2 of the electric motor M1 and the central angles (phase angles) γ1 and γ2 of the generator G1.

As is clear from the comparison between FIGS. 6 and 8, and the comparison between FIGS. 7 and 9, the rotor 13 of the electric motor M1 and the rotor 17 of the generator G1 are coupled to rotate together in a state where the first phase angle γ2M and the second phase angle γ2G are shifted from each other. The first phase angle γ2M is a phase angle formed by the center line LT passing through the center of rotation of each set of the magnet bodies JT in the rotor 13 of the electric motor M1 with respect to the core 31 in the stator 12 of the electric motor M1. The second phase angle γ2G is a phase angle formed by the center line LT passing through the center of rotation of each set of the magnet bodies JT in the rotor 17 of the generator G1 with respect to the core 31 in the stator 16 of the generator G1.

As described earlier, the first phase angle γ2 (γ2M) shown in FIGS. 6 and 7 is 15 degrees. The second phase angle γ2 (γ2G) shown in FIGS. 8 and 9 is 30 degrees. Since the direction of the first phase angle γ2 is opposite to the direction of the second phase angle γ2, the phase difference therebetween is calculated by the equation: 15+30=45 degrees.

In short, the rotor 13 of the electric motor M1 and the rotor 17 of the generator G1 are coupled to each other in such a manner that the position of the magnet body JT (the center line LT) has a phase difference of 45 degrees, and the rotor 13 of the electric motor M1 and the rotor 17 of the generator G1 rotate with such a state maintained.

As is clear from the comparison between the electric motor M1 of FIGS. 6 and 7 and the generator G1 of FIGS. 8 and 9, the position of the joint member 42 provided with respect to the permanent magnet 41 which is disposed at a position common to the electric motor M1 and the generator G1 is shifted by 45 degrees between the electric motor M1 and the generator G1. This also shows that the phase difference in the magnet body JT is 45 degrees.

The phase angle of the magnet body JT is different between the electric motor M1 and the generator G1 as described above. Thereby, a detent torque caused by an attraction force between the core 31 and the permanent magnet 41 is compensated by the electric motor M1 and the generator G1, and the entire detent torque is remarkably reduced.

As is clear from the comparison between FIGS. 6 and 7, and the comparison between FIGS. 8 and 9, in the rotor 13 of the electric motor M1 and the rotor 17 of the generator G1, the permanent magnets 41 and the magnet bodies JT are disposed axisymmetrically with respect to each other with the magnetic pole line LU of the permanent magnet 41 opposed to the core YA1 regarded as a symmetrical axis.

Stated differently, referring to FIGS. 6-7 and FIGS. 8-9, the rotor 13 of the electric motor M1 and the rotor 17 of the generator G1 have a mirror-image relationship with respect to, as the center line, the magnetic pole line LU shifted by 7.5 degrees from the center line LT of the core YA1.

In other words, when the arrangement of the magnet bodies JT of the rotor 13 are inverted horizontally with respect to, as the center line, the magnetic pole line LU of FIG. 6 or 7, for example, the resultant arrangement of the magnet bodies JT correspond to the arrangement of the magnet bodies JT of the rotor 17 of FIG. 8 or 9.

The rotor 13 of the electric motor M1 and the rotor 17 of the generator G1 are disposed as described above. Thereby, a detent torque caused by an attraction force between the core 31 and the permanent magnet 41 is compensated or reduced by the electric motor M1 and the generator G1, so that the detent torque is remarkably reduced as a whole.

The reduction in detent torque improves the efficiency of the motor generator 1.

The reason for the reduction in detent torque in the motor generator 1 is assumed as follows.

In the A-rotor 13a and the B-rotor 13b of FIGS. 6 and 7, namely, in the rotor 13, attraction forces act between the counter faces TK of each of the magnet bodies JT and two cores 31 opposed to the counter faces TK, so that the attraction forces turn into a detent torque. The position shown in each of FIGS. 6 and 7 is an example of a stable position of the rotor 13 in the free state. Every time when the rotor 13 rotates in either direction, to the right or left, by 30 degrees corresponding to an arrangement pitch β1 of the cores 31, the rotor 13 has the possibility of turning into the same state to be stable.

In the A-rotor 17a and the B-rotor 17b of FIGS. 8 and 9, attraction forces act between the counter faces TK of each of the magnet bodies JT and two cores 31 opposed to the counter faces TK, so that the attraction forces turn into a detent torque. The position shown in each of FIGS. 8 and 9 is an example of a stable position of the rotor 17 in the free state.

In the meantime, the phase difference in the magnet body JT between the rotor 13 of the electric motor M1 and the rotor 17 of the generator G1 is 45 degrees as described above. In respect of an attraction force between the permanent magnet 41 and the core 31 from which a detent torque is caused, the rotor turns into the same state by 30 degrees each. The change in magnitude and direction of the detent torque is repeated with 30 degrees regarded as one cycle. As for change in detent torque, therefore, the phase difference between the rotor 13 of the electric motor M1 and the rotor 17 of the generator G1 is 15 degrees (=45−30).

Thus, the rotor 13 of the electric motor M1 and the rotor 17 of the generator G1 have phases opposite to each other in change in detent torque by the permanent magnet 41. The individual detent torques are compensated by each other, so that the combined torque becomes zero or is reduced remarkably. Stated differently, in the free state, no detent torque acts on the rotary shaft 11, so that the rotary shaft 11 can be rotated easily with hand.

Therefore, in the free state, the rotor 13 of the electric motor M1 and the rotor 17 of the generator G1 are not limited to the angular positions of FIGS. 6-9, which means that the rotor 13 of the electric motor M1 and the rotor 17 of the generator G1 are stoppable at any angular positions.

Thus, the strength of the magnetic force of the counter faces TK in the magnet bodies JT of each of the rotors 13 and 17, the size of a gap between the core 31 and the counter face TK, and so on are selectively designed. This makes it possible to set a stop position in the free state at a desired position.

Second Embodiment: 8-Pole Electric Motor—4-Pole Generator

According to the motor generator 1 of the first embodiment, in the generator G1, the magnetic poles formed by the magnet bodies JT are 8 poles as described earlier. In a motor generator 1B according to the second embodiment, there is used a generator G1B in which the magnetic poles formed by the magnet bodies JT are 4 poles.

To be specific, the motor generator 1B is provided with the electric motor M1 and the generator G1B. The motor generator 1B also has a rotary shaft 11 which is provided common to the electric motor M1 and the generator G1B. The electric motor M1 is the same as that discussed above and is an 8-pole electric motor.

In the generator G1B, an output frequency with respect to the same rotational speed is reduced to a half of that in the generator G1. In view of this, when a frequency is excessively high for the 8-pole generator G1, the motor generator 1B with the 4-pole generator G1B is used.

Figure 10:
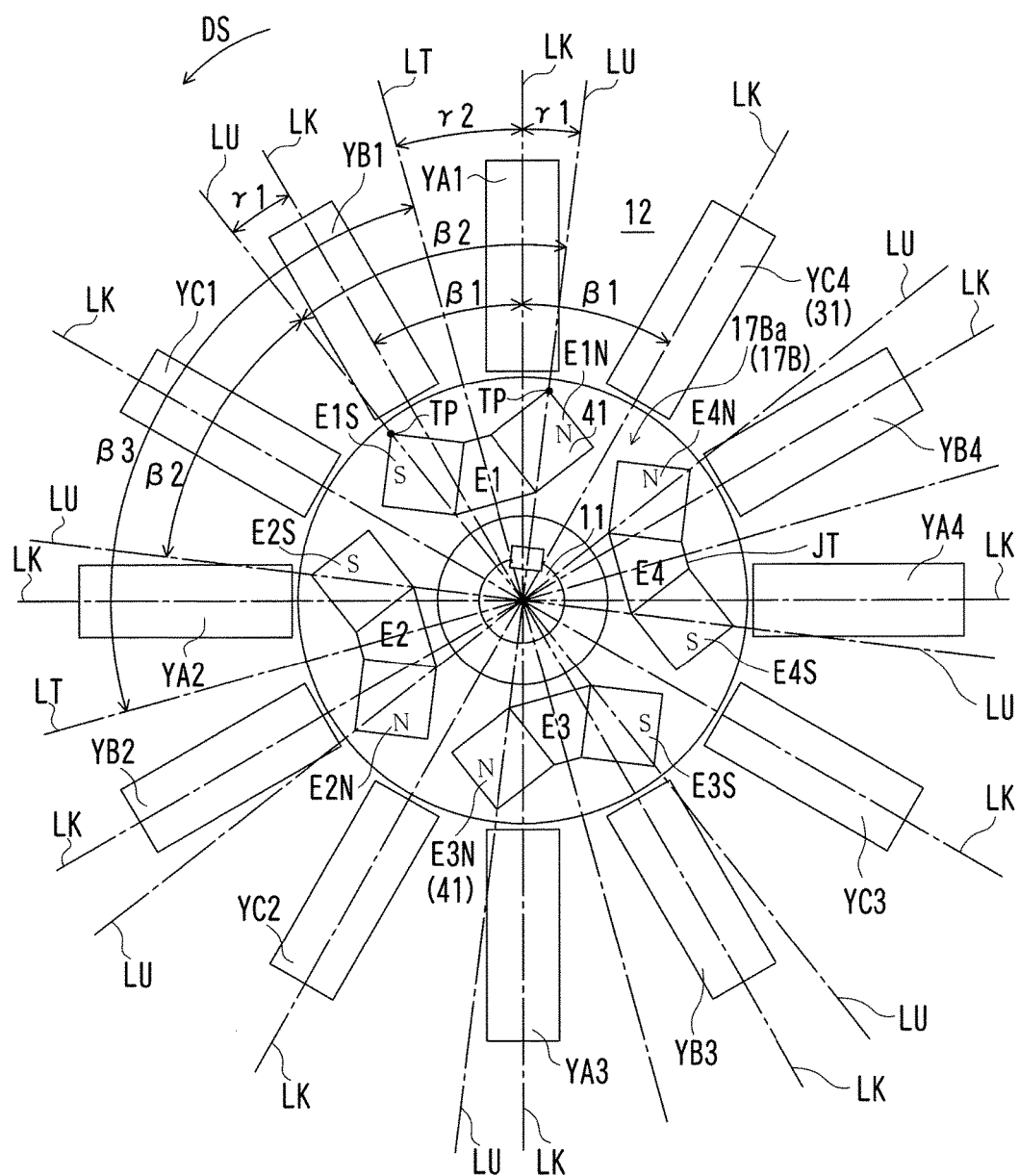
FIG. 10 is a diagram showing polarities of magnet bodies in an A-generator of a 4-pole generator according to a second embodiment.
Figure 11:
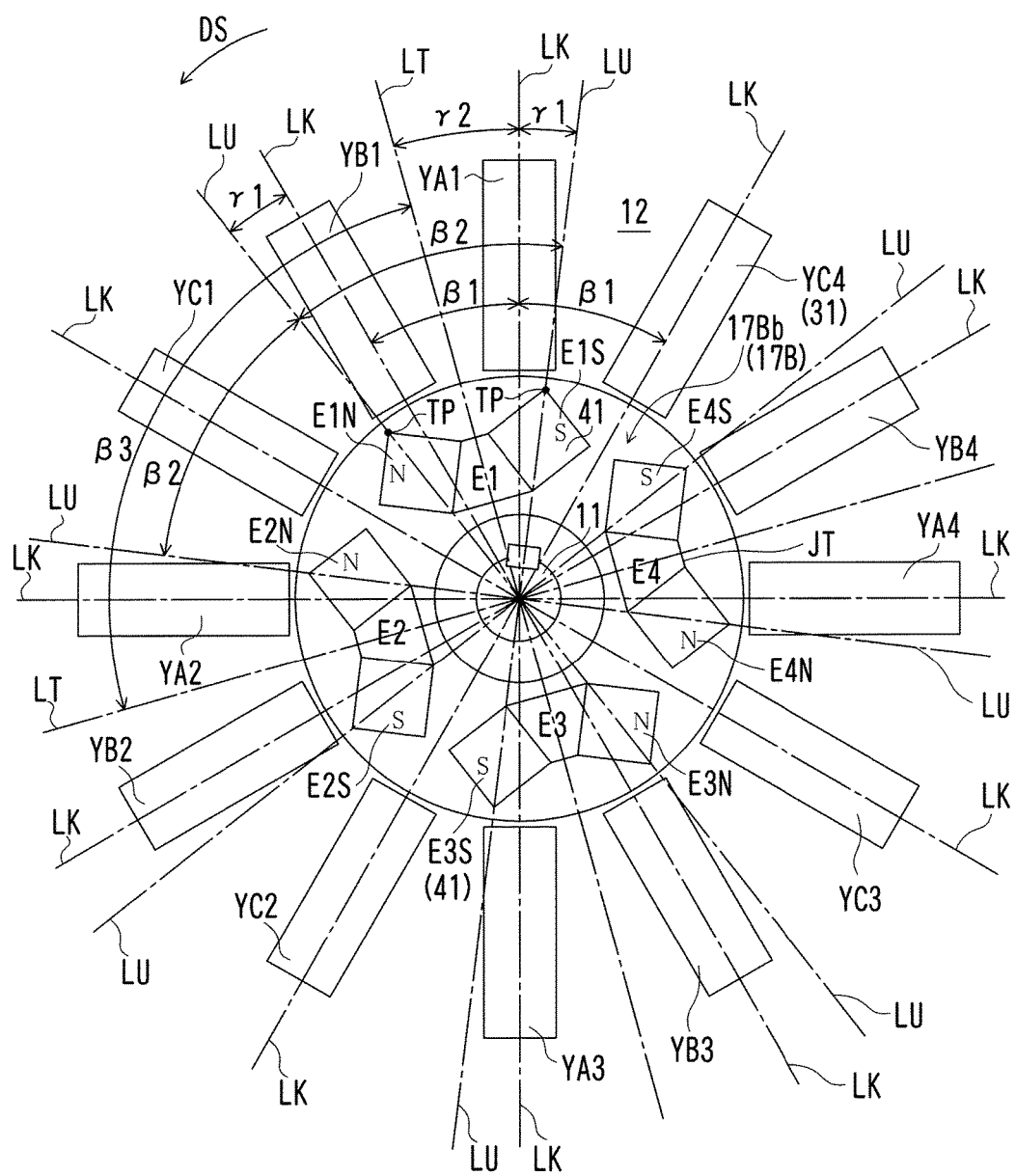
FIG. 11 is a diagram showing polarities of magnet bodies in a B-generator of the 4-pole generator according to the second embodiment.

FIGS. 10 and 11 show sectional views taken along the line CC-CC and the line DD-DD of FIG. 1 for the case where the magnetic poles by the magnet bodies JT of the rotor 17 of the generator G1B are 4 poles.

To be specific, FIG. 10 shows polarities of magnetic poles in an A-rotor 17Ba of an A-generator GAB of the generator G1B according to the second embodiment. FIG. 11 shows polarities of magnetic poles in a B-rotor 17Bb of a B-generator GBB of the generator G1B.

In FIGS. 10 and 11, constituent elements that are the same as those in FIGS. 8 and 9 are given the same reference signs or denoted by similar reference signs each of which is a combination of the same reference signs in FIGS. 8 and 9 and a sign "B", and descriptions thereof are omitted or simplified. The same is similarly applied to the third embodiment and beyond. Instead of the sign "B", however, a sign "C" or "D" is added in the third embodiment and beyond.

A rotor 17B of the 4-pole generator G1B shown in the second embodiment is different from the rotor 17 of the 8-pole generator G1 described earlier in arrangement of the joint members 42 and polarities of the counter faces TK.

To be specific, as is clear from the comparison between FIGS. 8-9 and FIGS. 10-11, the angular positions of the joint members 42 are shifted by 45 degrees between the rotor 13 and the rotor 17B, so that the angular positions of the magnet bodies JT are shifted by 45 degrees therebetween.

However, concerning the arrangement of the permanent magnets 41, the angular positions thereof are the same in the rotor 13 and the rotor 17B, which means that the angular positions of the permanent magnets 41 are aligned.

Stated differently, in the rotor 13 of the electric motor M1 and the rotor 17B of the generator G1B, the magnetic poles of the counter faces TK in the magnet bodies JT are so disposed that a first number of poles NP1 and a second number of poles NP2 are different from each other. The first number of poles NP1 is the number of magnetic poles formed by all the magnet bodies JT in the rotor 13 of the electric motor M1. The second number of poles NP2 is the number of magnetic poles formed by all the magnet bodies JT in the rotor 17B of the generator G1B.

In the rotor 17B of the generator G1B, magnetic poles of the counter faces TK of two permanent magnets 41 close to each other in two magnet bodies JT adjacent to each other in the circumferential direction are the same as each other.

The rotor 13 and the rotor 17B are coupled to rotate together in a state where a first phase angle and a second phase angle are the same as each other. The first phase angle is a phase angle in each set of the magnet bodies JT in the rotor 13. The second phase angle is a phase angle in each set of the magnet bodies JT in the rotor 17B.

In the rotor 13, 8n (n is an integer) permanent magnets 41 arranged in a circle form 4n magnet bodies JT. In the two magnet bodies JT adjacent to each other in the circumferential direction, the magnetic poles of the counter faces TK of two permanent magnets 41 close to each other are different from each other. Thereby, magnetic poles of 8n poles are formed.

In the rotor 17B, 8m (m is an integer) permanent magnets 41 arranged in a circle form 4m magnet bodies JT. In the two magnet bodies JT adjacent to each other in the circumferential direction, the magnetic poles of the counter faces TK of two permanent magnets 41 close to each other are the same as each other. Thereby, magnetic poles of 4m poles are formed.

In the illustrated examples of FIGS. 10 and 11, the integer denoted by "n" and "m" each is 1.

The rotor 17B has the A-rotor 17Ba and the B-rotor 17Bb which rotate together. The A-rotor 17Ba and the B-rotor 17Bb have basically the same structure. The A-rotor 17Ba and the B-rotor 17Bb are different in polarities of the counter faces TK.

To be specific, referring to the rotor 17Ba of FIG. 10, in the two magnet bodies E1 and E2 adjacent to each other in the circumferential direction, the magnetic poles of the counter faces TK of two permanent magnets E1S and E2S close to each other are the same as each other, namely, the S-pole each. In the two magnet bodies E1 and E4, the magnetic poles of the counter faces TK of two permanent magnets E1N and E4N are the same as each other, namely, the N-pole each.

Therefore, in the rotor 17Ba, the permanent magnets E1S and E2S form the S-pole, the permanent magnets E2N and E3N form the N-pole, the permanent magnets E3S and E4S form the S-pole, and the permanent magnets E4N and E1N form the N-pole. The number of poles (second number of poles NP2) is 4. The position of each of the magnetic poles is an intermediate position between the neighboring magnet bodies JT. The position of each of the magnetic poles is shifted, by 45 degrees, from the magnetic pole line LU of each of the magnet bodies JT.

The rotor 17Ba and the rotor 17Bb are different from each other in polarity.

As with the motor generator 1, also in the motor generator 1B, the phase angle of the magnet body JT is different between the electric motor M1 and the generator G1. Thereby, a detent torque caused by an attraction force between the core 31 and the permanent magnet 41 is compensated by the electric motor M1 and the generator G1, and the detent torque is reduced.

In order to reduce the detent torque, the magnetic poles are preferably arranged in such a manner that the detent torque caused by the attraction force between the core 31 and the permanent magnet 41 is compensated by the rotor 13 of the electric motor M1 and the rotors 17 and 17B of the generators G1 and G1B.

In light of the above, aside from the examples shown in FIGS. 6-11, the magnetic poles may be disposed in the following manner.

(1) In the electric motor M1, the magnetic poles are arranged as shown in FIGS. 6 and 7. As for the generator G1, the magnet bodies JT are arranged as shown in FIGS. 8 and 9, and further, the polarities of the counter faces TK, in particular, the magnetic poles of the counter faces TK adjacent to each other of two permanent magnets 41 are set to be the same as each other. In such a case, the number of poles (second number of poles NP2) of the rotor 17 in the generator G1 is 4.

(2) In the electric motor M1, the magnetic poles are arranged as shown in FIGS. 6 and 7. As for the generator G1, the phase angle of the rotor 17B is shifted to the right or the left, by 45 degrees, from the positions shown in FIGS. 10 and 11. In such a case, the arrangement of the magnet bodies JT of the rotor 17B is the same as that shown in FIGS. 8 and 9 in which the polarities of the counter faces TK of two permanent magnets 41 which are close to each other are set to be the same as each other.

In order to change the phase angles of the rotors 13, 17, and 17B, for example, it is preferable to change mounting angular positions thereof with respect to the rotary shaft 11. In order to change the mounting angular positions, for example, angular position of the key 48 with respect to each of the rotors 13, 17, and 17B is preferably changed.

The phase angle (rotation angular position) of each of the rotors 13, 17, and 17B is a relative angular position of each of the stators 12 and 16 to the core 31. Therefore, instead of changing the angular positions of the rotors 13, 17, and 17B, or, along with changing the angular positions thereof, the arrangement (phase angle) of the core 31 in the stators 12 and 16 may be changed.

In the foregoing embodiments, a detent torque is compensated by the electric motor M1 and the generator G1 and by the electric motor M1 and the generator G1B. Instead of this, however, the arrangement, magnetic poles, and phase angles of the rotors 13, 17, and 17B or the core 31 may be set so that the detent torque is compensated in the electric motor M1 or each of the generator G1 and G1B.

Third Embodiment: 8-Pole Electric Motor—8-Pole Generator

The description goes onto a motor generator 1C according to the third embodiment. The motor generator 1C of the third embodiment is provided with an electric motor M1C and a generator G1C.

Figure 12:
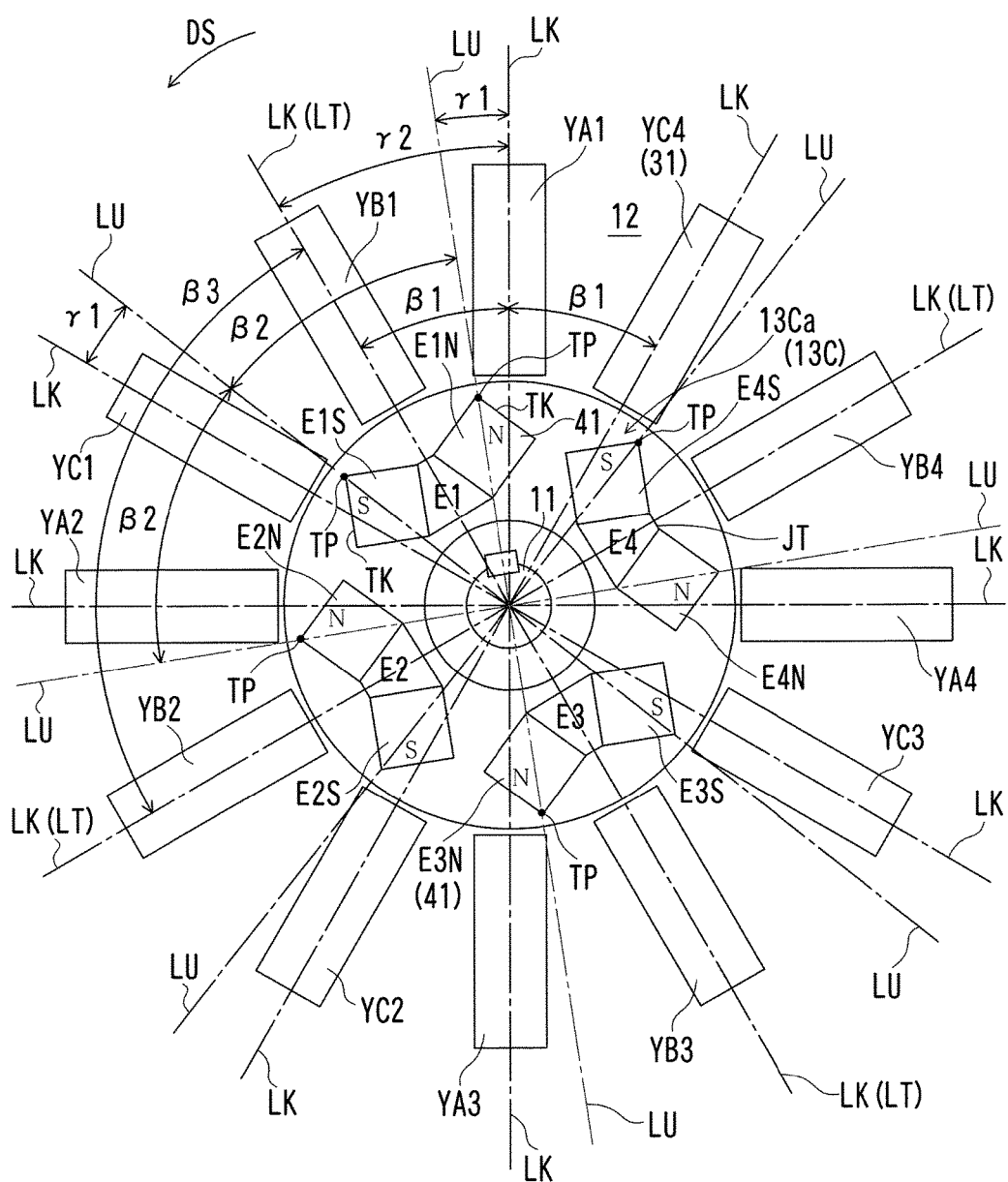
FIG. 12 is a diagram showing polarities of magnet bodies in an A-electric motor of an 8-pole electric motor according to a third embodiment.
Figure 13:
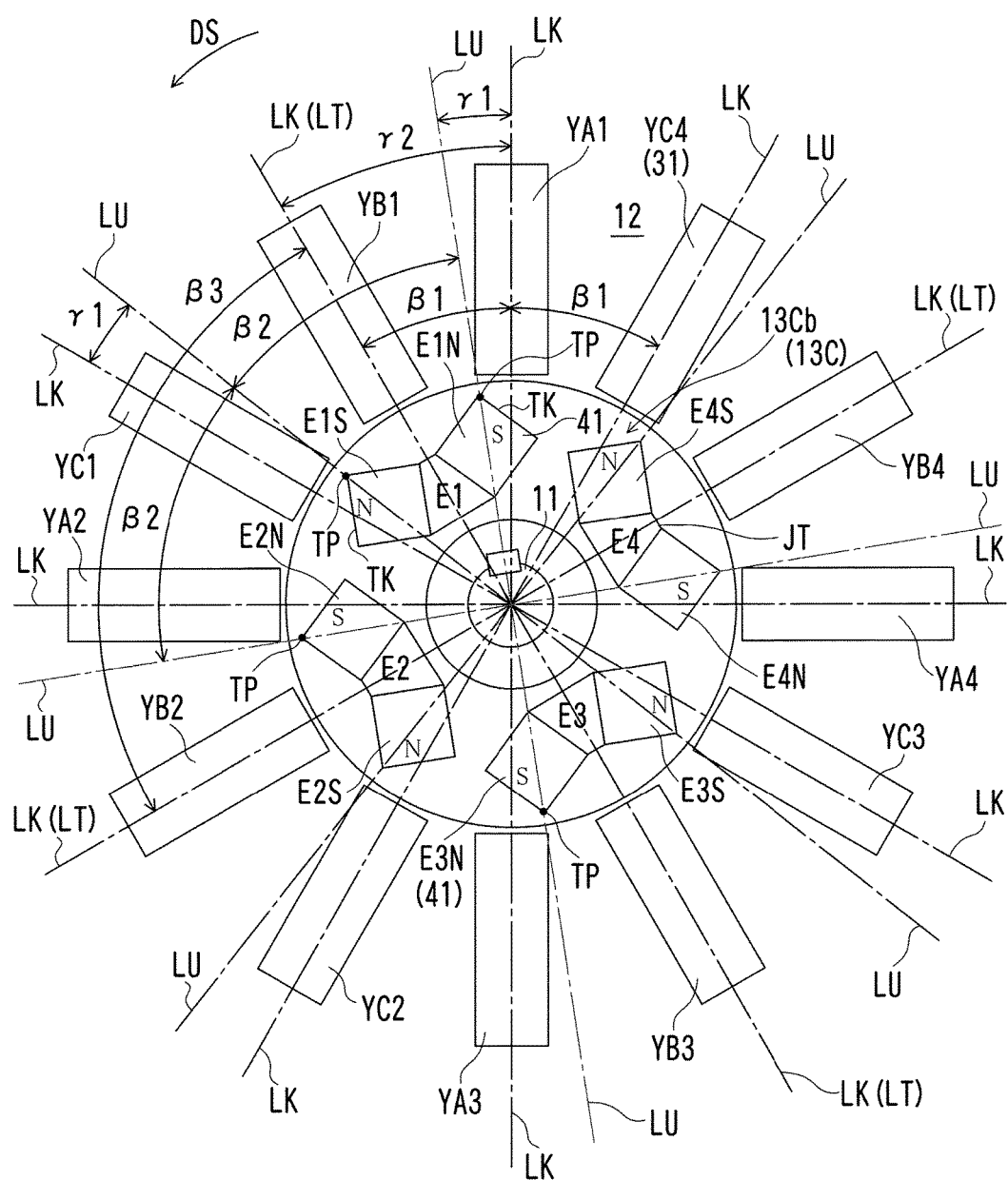
FIG. 13 is a diagram showing polarities of magnet bodies in a B-electric motor of the 8-pole electric motor according to the third embodiment.
Figure 14:
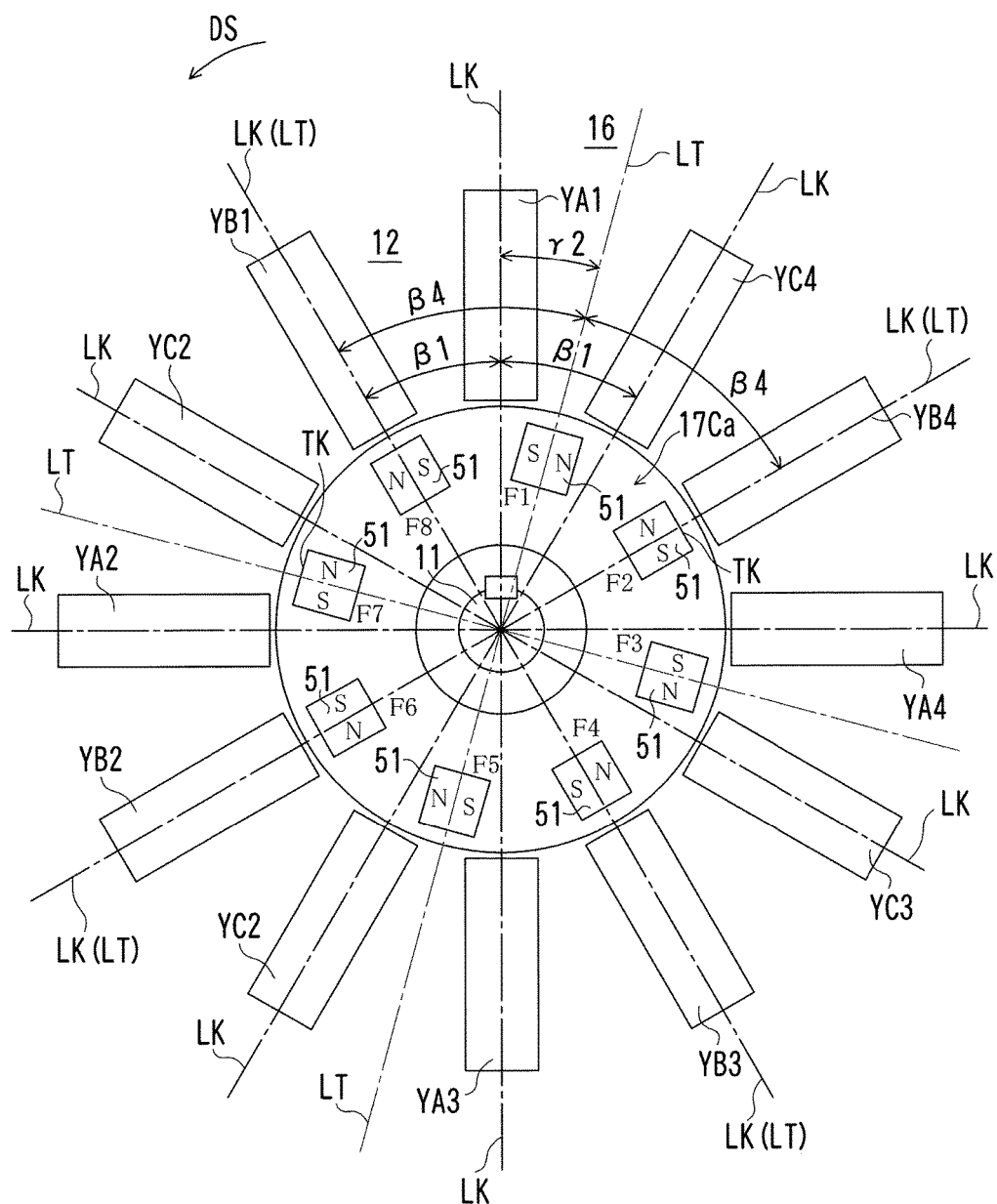
FIG. 14 is a diagram showing polarities of magnet bodies in an A-generator of an 8-pole generator according to the third embodiment.
Figure 15:
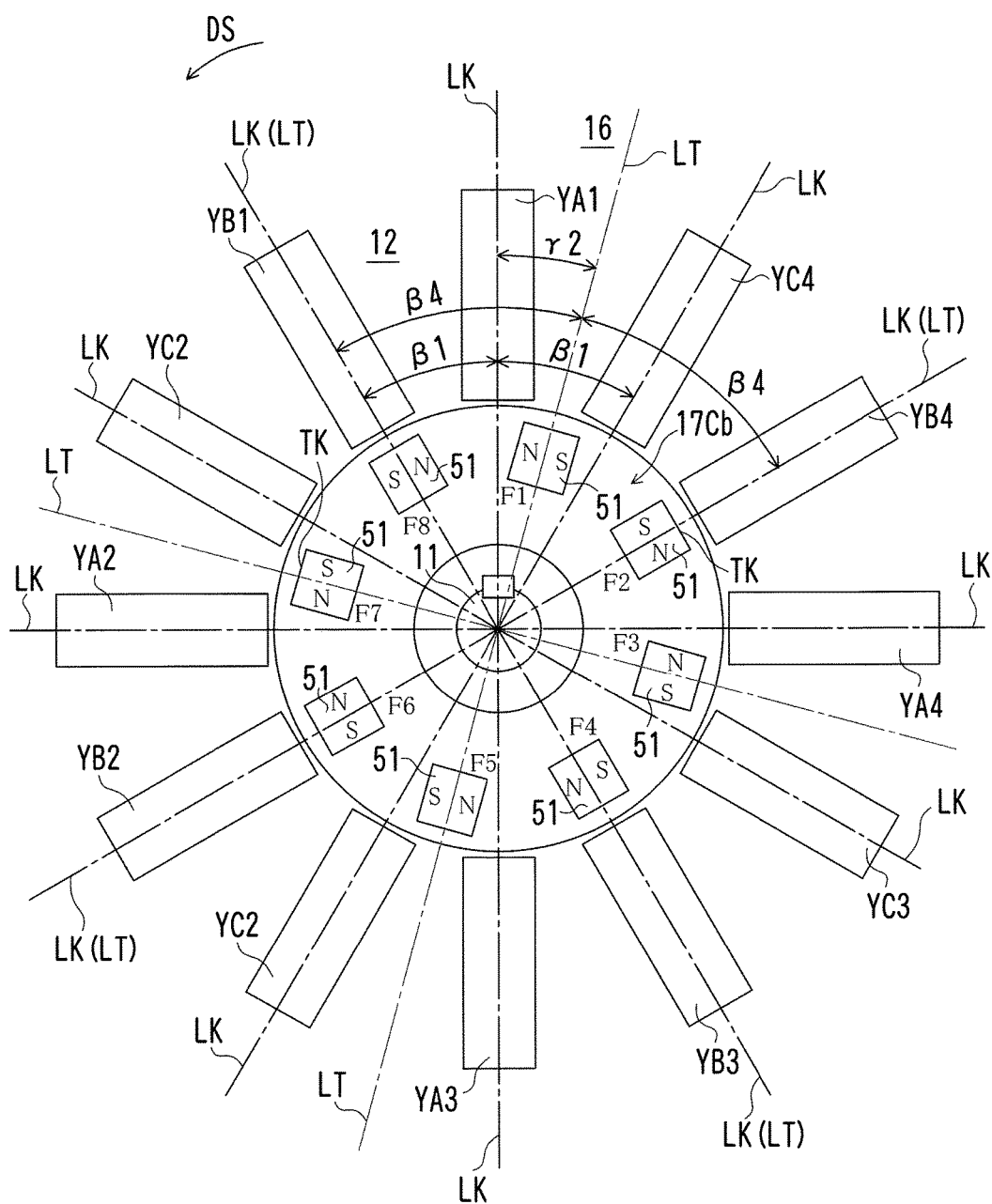
FIG. 15 is a diagram showing polarities of magnet bodies in a B-generator of the 8-pole generator according to the third embodiment.

FIG. 12 shows polarities of magnetic poles in an A-rotor 13Ca of the electric motor M1C; and FIG. 13 shows polarities of magnetic poles in a B-rotor 13Cb of the electric motor M1C. FIG. 14 shows polarities of magnetic poles in an A-rotor 17Ca of the generator G1C; and FIG. 15 shows polarities of magnetic poles in a B-rotor 17Cb of the generator G1C. FIGS. 12-15 show states of rotation angular position of the A-rotor 13Ca, the B-rotor 13Cb, the A-rotor 17Ca, and the B-rotor 17Cb, respectively at the same hour. The A-rotor 13Ca, the B-rotor 13Cb, the A-rotor 17Ca, and the B-rotor 17Cb rotate at the same time with the relative positional relationship maintained in the circumferential direction.

As shown in FIGS. 12 and 13, the electric motor M1C of the third embodiment has the same structure as that of the electric motor M1 of the first embodiment. The rotor 13C, however, stops so that, in a free state, at least a part of at least one counter face TK of each of the magnet bodies JT faces the end face of the core 31.

To be specific, the rotor 13C stops in a state where, in each of the magnet bodies JT, two apexes TP which are corners, closer to the cores 31, of the two counter faces TK, specifically, one of the two apexes TP of the counter face TK on the rear side in the rotational direction of the rotor 13C is positioned at an edge, on the front side in the rotational direction of the rotor 13C, of the end face of the opposed core 31, and the other apex TP of the counter face TK on the front side in the rotational direction of the rotor 13C is positioned at an edge, on the rear side in the rotational direction of the rotor 13C, of the end face of the opposed core 31.

Stated differently, in the stator 12, the twelve cores 31 are so arranged that a central angle formed by the adjacent cores is 30 degrees. In the rotor 13C, the eight permanent magnets 41 arranged in a circle form four magnet bodies JT. Eight apexes TP of the eight permanent magnets 41 are so arranged that a central angle formed by the apexes is 45 degrees. Both of two counter faces TK of each of the magnet bodies JT are so stopped to face the end faces of the two cores 31 disposed with one core 31 interposed therebetween.

In FIGS. 12 and 13, a magnetic pole line LU is shown which passes through an apex TP and the center of rotation KC. The central angle formed by the two adjacent magnetic pole lines LU is 45 degrees as described above.

The center line LT of the magnet body JT corresponds to the center line LK of the core 31. The position of the center line LT of the magnet body JT (E1) shown at the top of the drawing is shifted, by γ2=30 degrees, to the left from the center line LK of the core 31 shown at the top.

In short, the rotor 13C of the third embodiment stops at a position which is shifted, by 15 degrees, to the left as compared with the rotor 13 of the first embodiment shown in FIG. 6.

In this state, the position of the magnetic pole line LU passing through the apex TP of the counter face TK on the rear side of the rotational direction of the magnet body JT (E1) shown at the top is shifted, by γ1=7.5 degrees, to the left from the center line LK of the core 31 shown at the top. In such a case, as is clear from the drawing, the apex TP is positioned on the edge, on the rear side of the rotational direction, of the end face of the core 31. Each of the counter faces TK of each of the magnet bodies JT is arranged to stop to face the end face of the core 31.

In the rotor 13C, in a state where each of the counter faces TK of each of the magnet bodies JT faces the end face of the core 31, it can be said that a detent torque caused by an attraction force between the core 31 and the permanent magnet 41 is large.

As shown in FIGS. 14 and 15, the generator G1C of the third embodiment uses eight permanent magnets 51 each of which has a rectangular shape as viewed from the axial direction, and has the N-pole and the S-pole formed along the tangential direction of the circumference. In other words, as each of the permanent magnets 51, the permanent magnet 51 having a parallelepiped shape which is substantially the same as that of the permanent magnet 41 used in the magnet body JT is used.

The permanent magnet 51 shown at the top of the drawing is referred to as "F1". In the clockwise direction from the top permanent magnet 51, the permanent magnets 51 are referred to as "F2", "F3", "F4", and . . . "F8". Any one of the permanent magnets F1-F8 is sometimes referred to as a "permanent magnet F".

The eight permanent magnets F1-F8 are disposed, in this order, at regular intervals along the circumferential direction. To be specific, the center lines LT of the permanent magnets F1-F8 make individual central angles of β4 (=45 degrees). The position of the center line LT of the permanent magnet F1 shown at the top is shifted, by γ2=15 degrees, to the right from the center line LK of the core 31 shown at the top. In other words, out of the eight permanent magnets F1-F8, each of the four permanent magnets F1, F3, F5, and F7 is disposed between the two cores 31. The other four permanent magnets F2, F4, F6, and F8 are disposed at positions facing the end faces of the cores 31.

The permanent magnets F are so disposed that polarities of magnetic poles of opposed pole faces are the same between the permanent magnets F adjacent to each other in the circumferential direction. The position of the edge of the pole face of each of the permanent magnets 51 substantially corresponds to the position of the edge of the core 31. As for the rotor 17C, in this state, a detent torque caused by an attraction force between the core 31 and the permanent magnet F is large.

In the motor generator 1C, in both the rotors 13C and 17C of the electric motor M1C and the generator G1C, the detent torque is the largest in the states shown in FIGS. 12-15. Alternatively, the detent torque combined for the rotors 13C and 17C are the largest. Consequently, in a free state, the rotation stops in the states shown in the drawings.

Therefore, in starting from the stop states shown in FIGS. 12-15, a current is supplied to the winding 32 of each of the cores 31 for magnetization so that a repulsion force acts between the core 31 and the opposed counter face TK, on the rear side of the rotational direction of the rotor 13C, of each of the magnet bodies JT in the electric motor M1C, and further, so that an attraction force acts between the core 31 and the opposed counter face TK, on the front side of the rotational direction of the rotor 13C, of each of the magnet bodies JT. In this way, the rotor 13C is given a large rotational torque to start rotating smoothly. Once the rotor 13C starts, a current to be supplied to the winding 32 is preferably switched at a time depending on the rotation positions of the counter faces TK in the magnet bodies JT so as to maintain the rotational torque.

After the motor generator 1C starts to turn into a steady rotation state, the current supplied to the winding 32 is turned OFF. Thereby, the rotor 13C and 17C stop in the states as shown in FIGS. 12-15. In these states, the magnetic attraction force develops a static torque, so that the angular position of the rotors 13C and 17C in the free state are maintained.

In the foregoing examples, the case is described in which the positions of the apexes TP of the permanent magnets 41 substantially correspond to the edges of the cores 31 and the counter faces TK are almost fully opposed to the end faces of the cores 31. In such a case, the rotational torque at the initial stage of the start-up have a maximum value, contributing to the smooth start-up. As long as sufficient rotational torque is obtained, the smooth start-up is possible in any of the following cases: a case where only any one of two counter faces TK in each of the magnet bodied JT is opposed to the end face of the cores 31; and a case where a part of both or any one of the counter faces TK is opposed to the end face of the core 31.

As long as the rotor 13C takes the positions shown in FIGS. 12-15 in a free state, the starting current is small with the detent torque minimized, which facilitates the start-up. In light of this, the size and shape of the counter face TK of the magnet body JT, the permanent magnet 51 and the end face of the core 31 are selected to obtain optimum starting characteristics.

In the foregoing example, the 8-pole electric motor M1C is used. The number of poles is however not limited to this. Instead, a 4-pole, 12-pole, or 16-pole electric motor may be used. It is also possible to change, in the generator G1C, the number of permanent magnets 51 and the arrangement thereof, the orientation of the magnetic poles, the size and shape thereof.

As described above, any combination of the electric motor M1C and the generator G1C may be used. The arrangement of the rotor 13C, 17C, or the cores 31, and the magnetic pole, and the phase angle may be variously set. Alternatively, the electric motor M1C may be used as a single unit.

Fourth Embodiment: 16-Pole Electric Motor—8-Pole Generator

The description goes onto a motor generator 1D according to the fourth embodiment. The motor generator 1D of the fourth embodiment is provided with an electric motor M1D and a generator G1D.

Figure 16:
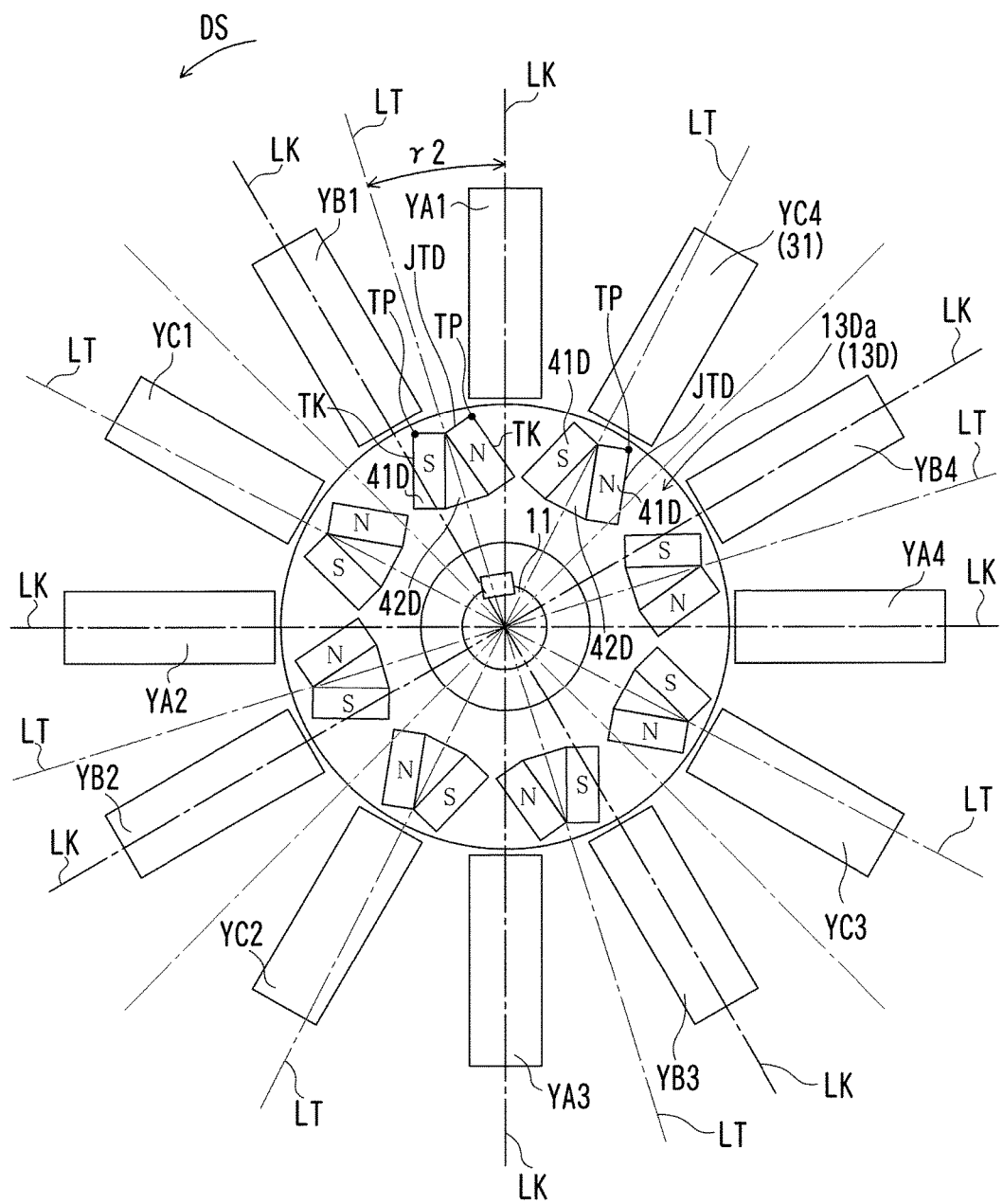
FIG. 16 is a diagram showing polarities of magnet bodies in an A-electric motor of a 16-pole electric motor according to a fourth embodiment.
Figure 17:
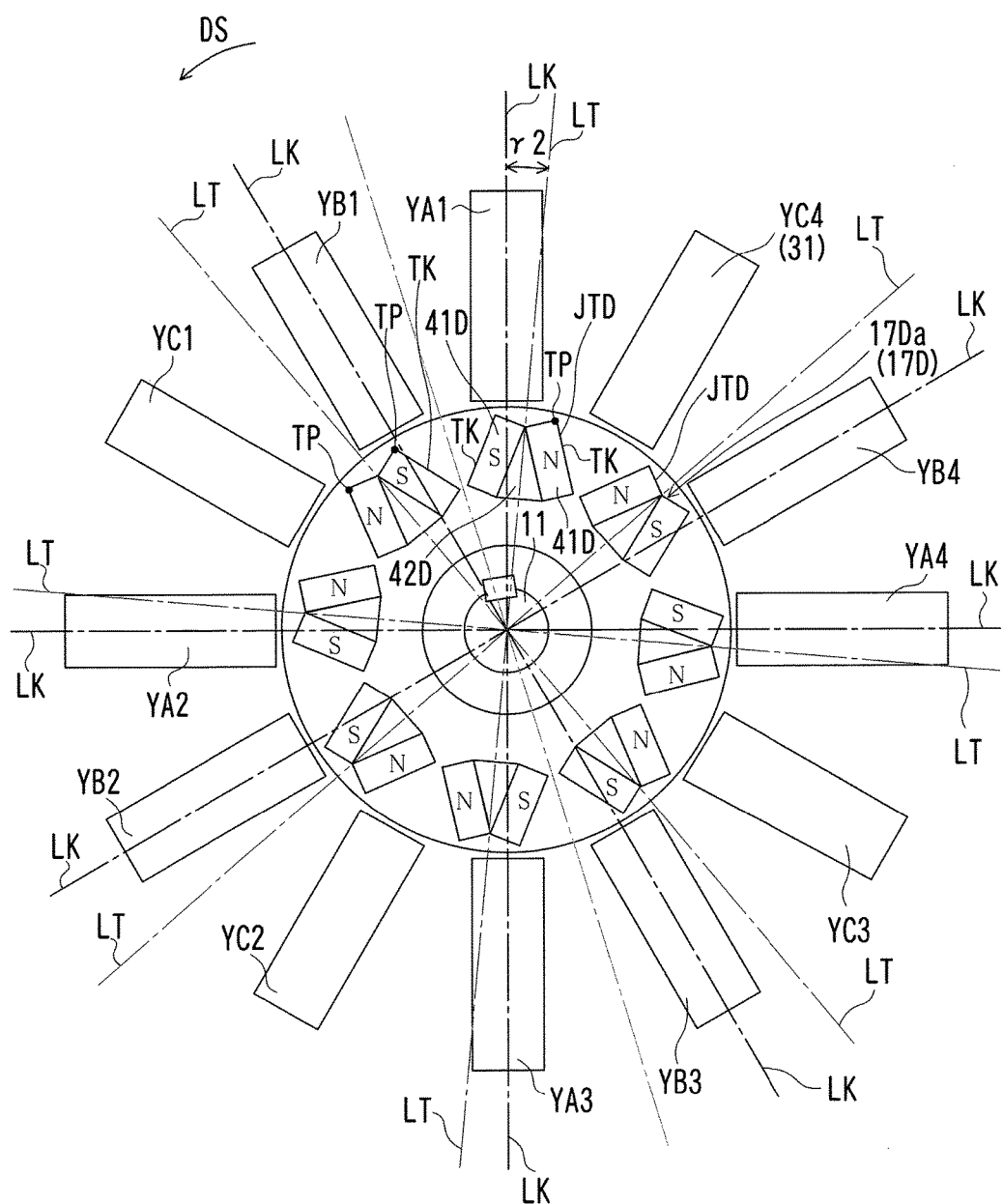
FIG. 17 is a diagram showing polarities of magnet bodies in an A-generator of a 16-pole generator according to the fourth embodiment.

FIG. 16 shows polarities of magnetic poles in an A-rotor 13Da of the electric motor M1D. FIG. 17 shows polarities of magnetic poles in an A-rotor 17Da of the generator G1D. A B-rotor 13Db of the electric motor M1D and a B-rotor 17Db of the generator G1D are the same as those in the other embodiments. The description thereof is thus omitted herein.

As shown in FIG. 16, a rotor 13D of the electric motor M1D in the fourth embodiment is provided with eight magnet bodies JTD. The magnet bodies JTD are disposed in a circle at regular intervals. To be more specific, the magnet bodies JTD are disposed in such a manner that the central angle formed by the adjacent magnet bodies JT is set at 45 degrees.

Each of the magnet bodies JTD has two permanent magnets 41D and one joint member 42D. With each of the magnet bodies JTD, the two permanent magnets 41D are so disposed that the counter faces TK have magnetic poles different from each other. In addition, the two counter faces TK are so disposed that inclinations with respect to the tangential direction of the circumference are reverse to each other, in other words, disposed that inclination angles αj are formed in directions opposite to each other. In this embodiment, the inclination angle αj is approximately 60 degrees. The joint member 42D has a front shape of a triangle.

The magnetic poles of the counter faces TK in the magnet bodies JTD which are adjacent to each other in the circumferential direction are different from each other.

As shown in FIG. 17, the rotor 13D of the generator G1D in the fourth embodiment is provided with eight magnet bodies JT having a structure similar to that of the electric motor M1D. However, the magnetic poles of the counter faces TK in the magnet bodies JTD which are adjacent to each other in the circumferential direction are the same as each other.

With the electric motor M1D and the generator G1CD, a detent torque obtained by combining for the rotor 13D and the rotor 17D is maximum in the states shown in FIGS. 16 and 17. Consequently, the rotor 13D stops in the free state shown in FIG. 16, namely in the state where at least a part of at least one counter face TK in each of the magnet bodies JTD of the rotor 13D is opposed to the end face of the core 31.

In this state, the position of the center line LT of the magnet body JTD shown at the top of the rotor 13Da is shifted, by γ2=17.5 degrees, to the left from the center line LK of the core 31 shown at the top. Further, the position of the center line LT of the magnet body JTD shown at the top of the rotor 17Da is shifted, by γ2=5 degrees, to the right from the center line LK of the core 31 shown at the top. In short, a position difference (phase difference) between the center line LT of the magnet body JTD of the rotor 13Da and the center line LT of the magnet body JTD in the rotor 17Da is 17.5+5=22.5 degrees.

Therefore, as with the third embodiment, in the fourth embodiment, in starting from the stop state shown in FIG. 16, a current is supplied to the winding 32 of each of the cores 31 for magnetization so that a repulsion force acts between the core 31 and the opposed counter face TK, on the rear side of the rotational direction of the rotor 13D, of each of the magnet bodies JTD in the electric motor M1D, and further, so that an attraction force acts between the core 31 and the opposed counter face TK, on the front side of the rotational direction of the rotor 13D, of each of the magnet bodies JTD. In this way, the rotor 13D is given a large rotational torque to start rotating smoothly.

The position of the rotor 13D in the free state may be different from the position shown in FIG. 16 as long as the rotor 13D stops in a state where at least a part of the counter face TK of the rotor 13D faces the end face of the core 31.

[Structure of Magnet Body]

In each of the foregoing embodiments, the two permanent magnets 41 and 41D and one joint member 42 or 42D constitute the magnet body JT. The magnet body JT uses the magnetism to obtain a rotational torque. Therefore, the magnet body JT may have a structure different from the one described above, provided that the magnet body JT has the same magnetic function as the one described above. The same is similarly applied to the magnet body JTD.

Figure 18B:
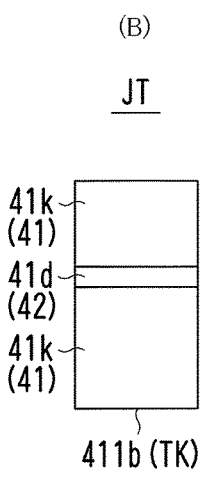
FIGS. 18A and 18B are diagrams showing examples of the structure of a magnet body.
Figure 18A:
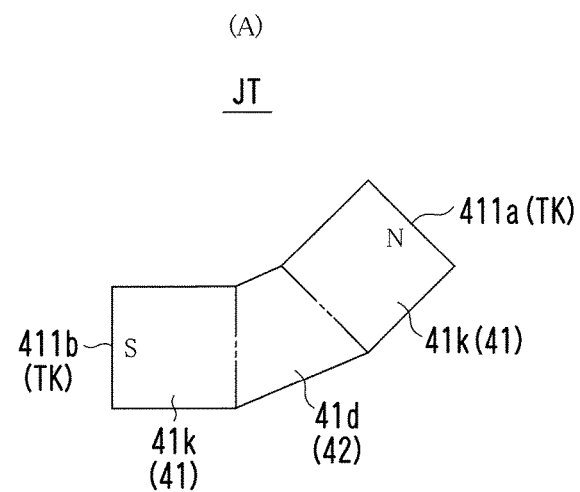

FIGS. 18A and 18B show examples of the structure of the magnet body JT. FIG. 18A is a front view thereof, and FIG. 18B is a side view thereof.

As shown in FIGS. 18A and 18B, the magnet body JT has two permanent magnets 41 and two joint members 42 which are integrated with each other to be provided as one permanent magnet. To be specific, the magnet body JT has a shape in which two rectangular parts 41k and a trapezoid part 41d are connected together. The two rectangular parts 41k have a rectangular shape (front shape) as viewed from the axial direction. The trapezoid part 41d is provided between the opposed faces of the two rectangular parts 41k.

Each of the two pole faces 411a and 411b corresponding to both ends of the magnet body JT is a counter face TK which is to face the core 31 when the two pole faces 411a and 411b come to the front of the core 31.

As discussed above, the "magnet body" recited in the present invention may be formed by using permanent magnets as one or more parts, and a joint member, if necessary.

[Concerning Control]

The description goes on to control on the motor generators 1, 1B, 1C, and 1D.

Referring to FIG. 1, a photo interrupter 61 is provided in order to detect a rotation angular position of the rotary shaft 11. A shield disk 62 is attached to the rotary shaft 11 to rotate together. Depending on the rotation angular position of the shield disk 62, one or more photo sensors of the photo interrupter 61 are turned ON/OFF. Based on ON/OFF signal of the photo sensor of the photo interrupter 61, the rotation angular position of the rotary shaft 11, i.e., the rotation angular positions of the rotors 13, 13C, 13D, 17, 17B, 17C, and 17D are detected.

Figure 19:
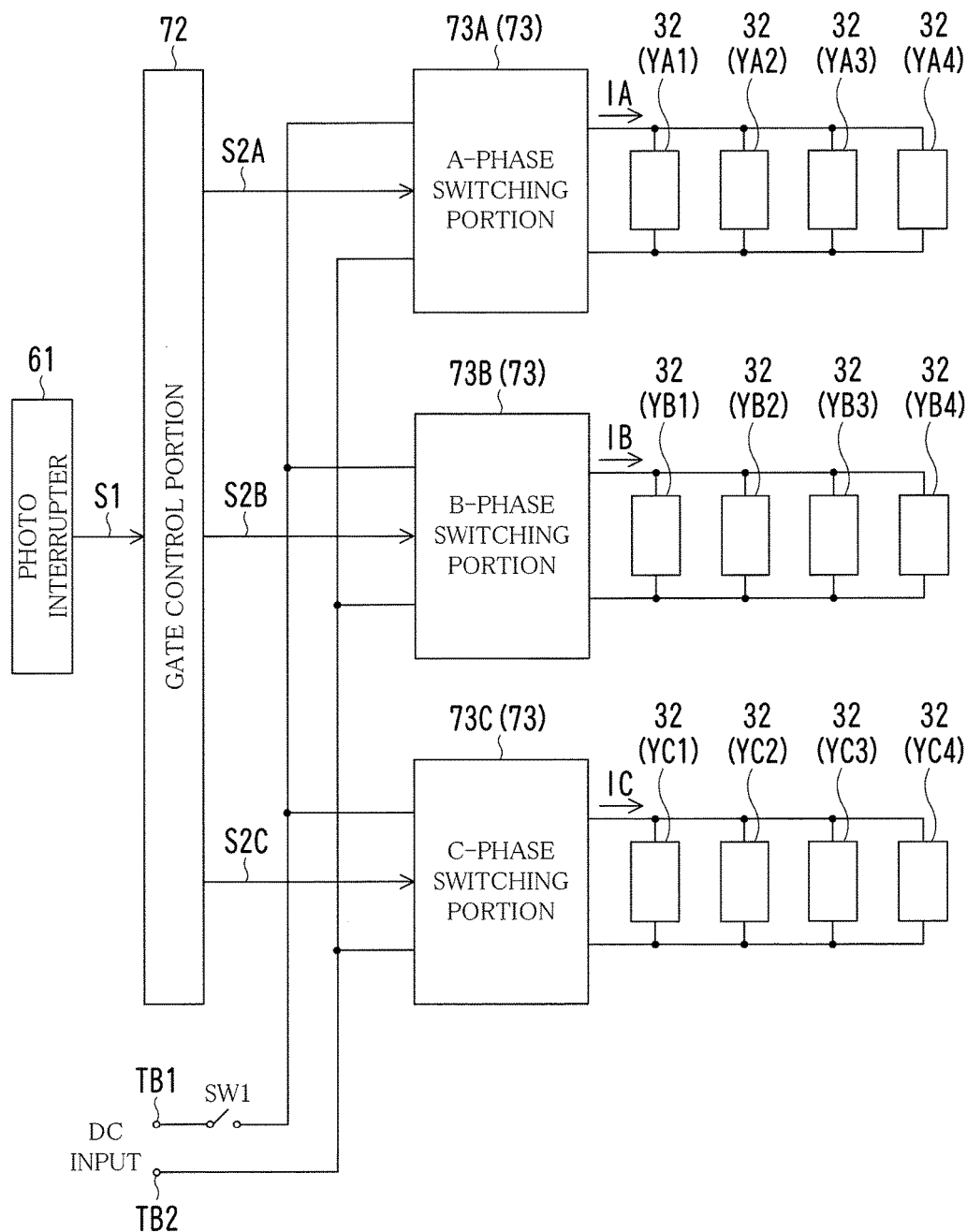
FIG. 19 is a block diagram showing an example of the configuration of a control unit.

FIG. 19 shows an example of the configuration of a control unit 71; and FIGS. 20 and 21 show how the control unit 71 controls ON/OFF of a current to be supplied to the winding 32 in the electric motor M. FIG. 20 shows control on an 8-pole electric motor M and FIG. 21 shows a control on a 16-pole electric motor M.

Referring to FIG. 19, the control unit 71 is configured of a gate control portion 72, a switching portion 73, and so on. The switching portion 73 has an A-phase switching portion 73A, a B-phase switching portion 73B, and a C-phase switching portion 73C.

The gate control portion 72 generates timing signals S2A, S2B, and S2C for turning ON/OFF a current to be supplied to each of the windings 32 of the electric motor M based on a signal S1 outputted by the photo interrupter 61.

To be more specific, referring also to FIG. 4, when the apex TP on the rear side of the rotational direction of the permanent magnet 41 of the electric motor M comes to the center of the cores YA, YB, and YC corresponding to the individual phases, or, alternatively, when the apex TP slightly passes, by a slight rotational angle, the center of the cores YA, YB, and YC, control is so performed that the corresponding switching portion 73A, 73B, or 73C is turned ON. When the switching portions 73A, 73B, and 73C are turned ON and then the apex TP rotates by ON angle θ2, control is so performed that the corresponding switching portion 73A, 73B, or 73C is turned OFF.

Since the ON angle θ2 herein is different depending on the shape and arrangement of the permanent magnet 41, and the magnitude of the load, adjustment is so made that the ON angle θ2 has an optimum value. For example, adjustment is so made that θ2 becomes equal to 27.5 degrees (mechanical angle). Adjustment may be so made that the ON angle θ2 has an appropriate value other than 27.5 degrees, for example, an appropriate value equal to or smaller than 27.5 degrees. Specifically, the ON angle θ2 may be adjusted to have a value of 27 degrees, 25 degrees, or 24 degrees. It is however preferable that the ON angle θ2 does not exceed 30 degrees. Stated differently, it is preferable that the current does not pass through the windings 32 of the individual phases at the same time. In this way, the ON angle θ2 is set to be smaller than 30 degrees (120 degrees in electric angle). This improves the efficiency because the remaining energy due to excitation does not work as a brake to act on the next counter face TK.

For adjustment of the ON angle θ2, a variety of methods may be used. For example, the ON angle θ2 can be adjusted by changing a shield angle or a transmission angle in the shield disk 62. For example, the ON angle θ2 may be adjusted by increasing or reducing a part which is blacken to block the light in the shield disk 62.

The rotation angular position may be detected on phase-by-phase basis by providing a dedicated photo interrupter 61 for each of the A-phase, B-phase, and C-phase.

The ON angle θ2 may be adjusted by using an appropriate timer means in the gate control portion 72 to change the elapsed time since the apex TP is detected. In such a case, a signal for rotational speed of the electric motor M is also used for operation. This enables the ON angle θ2 to be adjusted precisely.

The switching portion 73 for each phase receives the timing signals S2A, S2B, and S2C, and turns ON/OFF the current passing through the winding 32 of each phase based on the timing signals S2A, S2B, and S2C.

The switching portion 73 for each phase has an output terminal connected in parallel with the winding 32 of the core YA, YB, or YC of the corresponding phase.

The switching portion 73 for each phase turns ON/OFF the current passing through the winding 32 of the corresponding core YA, YB, or YC so that a repulsion force acts on the pole face of the permanent magnet 41 on the rear side of the rotational direction, and further so that an attraction force acts on the pole face of the permanent magnet 41 on the front side of the rotational direction. The direct current close to a square wave having a predetermined width and magnitude passes through the winding 32. The waveform is however distorted due to the transient and armature reaction.

When the current passes through the winding 32, the corresponding core YA, YB, or YC is excited, so that a magnetic pole of N-pole or S-pole is formed in the end faces 313a and 313b of the corresponding core YA, YB, or YC. This generates an attraction force or a repulsion force on the counter face TK of the permanent magnet 41 of the rotor 13. Thereby, a rotational torque is produced so that the rotary shaft 11 is rotationally driven.

In the switching portion 73, a power semiconductor switching element such as an FET or a bidirectional thyristor may be used to turn ON/OFF the current passing through the winding 32. The switching elements are controlled in response to a control signal input to the gate. The gate control portion 72 and the switching portion 73 are one example of a "switching portion" and a "timing control portion" recited in the present invention.

The control unit 71 has terminals TB1 and TB2 to supply the power source. A direct current power source is connected to the terminals TB1 and TB2. The direct current power source may be a stabilized direct current power supply or battery having a voltage of, for example, approximately several tens of volts to a hundred and several tens of volts, specifically, approximately 80 volts, for example. In this way, the electric motor M is driven to obtain a commercial alternating power of, for example, approximately 2 kW, from the generator G.

FIG. 20 shows, for the 8-pole electric motor M1C according to the third embodiment, ON/OFF timing in each phase corresponding to rotation angular position of the apex TP on the rear side.

For example, when the rotor 13C rotates and the apex TP on the rear side reaches a reference position, a current IA to be supplied to the winding 32 of the core YA is turned ON, and the current IA is supplied while the ON angle θ2 is taken. When the apex TP is rotated to reach a position corresponding to the ON angle θ2 from the reference position, the current IA is turned OFF.

The reference position may be a position on the center line LK of the core 31 positioned at the top. The reference position is regarded as 0 (zero) degrees.

When the current IA passes through the winding 32, a magnetic pole of the N-pole is formed in the end face 313a of the core YA, and a magnetic pole of the S-pole is formed in the end face 313b of the core YA. The counter face TK on which the apex TP, on the rear side of the rotational direction, of the permanent magnet 41 of the A-rotor 13Ca has an N-polarity. Therefore, the N-pole of the counter face TK repels the N-pole of the end face 313a of the core YA which faces the counter face TK, so that a rotational torque is produced in the left direction of the drawing. Further, the counter face TK on which the apex TP, on the front side of the rotational direction, of the permanent magnet 41 of the A-rotor 13Ca has an S-polarity. Therefore, the S-pole of the counter face TK is attracted to the N-pole of the end face 313a of the core YA, so that a rotational torque is produced in the left direction of the drawing.

The counter face TK on which the apex TP, on the rear side of the rotational direction, of the permanent magnet 41 of the B-rotor 13Cb has an S polarity, and the end face 313b of the core YA has an S polarity. Therefore, the repulsion force and attraction force act as described above, so that a rotational torque is produced in the left direction of the drawing. The rotational torque of the A-rotor 13Ca and the rotational torque of the B-rotor 13Cb are combined with each other to rotationally drive the rotary shaft 11.

When the apex TP comes to the central position of the next core YB, a current IB to be supplied to the winding 32 of the core YB is turned ON to produce a rotational torque. When the apex TP further comes to the central position of the next core YC, a current IC to be supplied to the winding 32 of the core YC is turned ON to produce a rotational torque as described above. In this way, the rotational torque is produced successively, and the rotary shaft 11 keeps rotating.

FIG. 21 shows, for the 16-pole electric motor M1D according to the fourth embodiment, ON/OFF timing in each phase corresponding to rotation angular position of the apex TP on the rear side.

For example, when the rotor 13D rotates and the apex TP on the rear side reaches a reference position, the current IA to be supplied to the winding 32 of the core YA is turned ON, and the current IA is supplied while the ON angle θ2 is taken. When the apex TP is rotated to reach a position corresponding to the ON angle θ2 from the reference position, the current IA is turned OFF.

As for the 16-pole electric motor M1D, the angle θ2 is equal to or smaller than 15 degrees. While the rotor 13D is rotated by 90 degrees, the current is turned ON for 45 degrees each, i.e., turned ON twice. The angle θ2 may be set at 15 degrees or greater. In the case where the angle θ2 is set at 15 degrees or greater, the total power supplied to the winding 32 exceeds 360 degrees, and a larger rotational torque can be obtained. Even in such a case, however, it is necessary to set the angle θ2 not to be larger than 30 degrees.

As discussed earlier, in starting the motor generators 1C and 1D from states where the motor generators 1C and 1D stop in free positions, a current is supplied to the winding 32 so that a repulsion force acts between the core 31 and the opposed counter face TK, on the rear side of the rotational direction, and further so that an attraction force acts between the core 31 and the opposed counter face TK, on the front side of the rotational direction. Thereafter, the control is preferably made as shown in FIG. 20 or FIG. 21.

Starting the motor generator 1 is basically the same as the case for the motor generators 1C and 1D. In starting the motor generator 1 from the state where the motor generator 1 stops at the positions shown in FIGS. 6 and 7, a current is supplied to the winding 32 so that a repulsion force acts between the counter face TK and the core 31 backward adjacent to the core 31 facing the apex TP on the rear side, and further so that an attraction force acts between the counter face TK and the core 31 forward adjacent to the core 31 facing the apex TP on the front side. Thereafter, the control is preferably made as shown in FIG. 20.

According to the motor generators 1, 1B, 1C, and 1D of the foregoing embodiments, the N-poles and the S-poles of the permanent magnets 41 provided in the rotor 13 of the electric motor M1 are used as the counter faces TK, so that both repulsion and attraction forces acting between the counter faces TK and the cores 31 can be converted into a rotational torque. Therefore, a large rotational torque can be developed.

The adjustment of the ON angle θ2 makes it possible to optimize or maximize the rotational torque developed.

In the foregoing control examples, the current IA, IB, or IC is supplied at the same time when the apex TP reaches the central position of the core. Instead of this, however, the timing may be changed to be earlier or later. To be specific, it is possible to pass the current through the winding 32 at a time when the apex TP1 passes by the central position of the core and rotation is made by the angle θ1. The angle θ1 is a minute angle, and may be a negative value. For example, the angle θ1 may be set to have a value within the range of approximately 0-3 degrees or 0-8 degrees. Specifically, the angle θ1 may be set at 3 degrees, 6 degrees, or 7.5 degrees.

In the generators G1, G1B, G1C, and G1D, the rotors 17, 17B, 17C, and 17D are rotationally driven by the rotary shaft 11 of the electric motor M1. Thereby, an induced electromotive force is generated in the winding 32 of the stator 16 and is taken externally as an alternating power. The winding 32 of the stator 16 is provided in the form of 3-phase connection, which outputs a 3-phase alternating power having a sine waveform. In particular, a detent torque of the entirety of the rotor 13, 13C, 13D, 17, 17B, 17C, or 17D of the motor generator 1, 1B, 1C, or 1D is reduced. This eliminates the unevenness in rotational speed. This enables an output waveform of the generator to be an appropriate sine waveform.

For example, in the motor generator 1C according to the third embodiment, the rotor 13C of the electric motor M1C and the rotor 17C of the generator G1C are designed by appropriately selecting the strength of the magnetic power of the magnet body JT and the permanent magnet 51, the size of a gap away from the core 31, and so on. Thereby, the start-up can be made smoothly with a stop position in the free state set at a desired position. Further, the output waveform of the generator G1C can be an appropriate sine wave without distortion.

In the control unit 71, it is possible to change/adjust the cycle or frequency, magnitude, and so on of the currents IA, IB, and IC to be outputted to the electric motor M. Thereby, the rotational speed and power (output) of the electric motor M can be controlled.

In the foregoing embodiments, the inclination angle αj may be set variously. For example, the inclination angle αj may be selected from a range of 30-90 degrees or the other ranges.

In the embodiments discussed above, the configurations of all or part of the rotary shaft 11, the stators 12 and 16, the rotors 13, 13C, 13D, 17, 17B, 17C, and 17D, the frame 21, the core 31, the winding 32, the permanent magnets 41, 41D, and 51, the joint member 42, the magnet bodies JT and JTD, the electric motors M1, M1C, and M1D, the generators G1, G1B, G1C, and G1D, and the motor generators 1, 1B, 1C, and 1D, structures, shapes, quantities, arrangements, directions, polarity, the number of poles, voltage, power, frequency, and so on may be arbitrarily modified in various ways within the spirit of the present invention. The configurations, structures, shapes, and quantities in the first embodiment through the fourth embodiment may be switched between one and another for combination.

The magnetic rotating apparatus, the electric motor, and the motor generator according to the present invention are applicable as electric motors or generators for industrial use, such as an electric vehicle, a hybrid vehicle, a railroad vehicle, a transportation machine, or others, are also applicable as generators for power generation such as hydroelectric power, thermal power, wind power, or tidal power, or others, are also applicable as a motor generator for frequency conversion or voltage conversion, or applicable as the other purposes.

What is claimed is:

1. A magnetic rotating apparatus comprising:
    a stator having a plurality of cores with a winding arranged at regular intervals along a circumferential direction; and
    a rotor which has a plurality of permanent magnets arranged at regular intervals along the circumferential direction and rotates facing the stator,
    wherein
    each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference,
    in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, and
    in two of the magnet bodies immediately adjacent in the circumferential direction, magnetic poles of counter faces of the two permanent magnets immediately adjacent to each other are different from each other.

2. The magnetic rotating apparatus according to claim 1, wherein the rotor includes a first rotor and a second rotor, and
    the first rotor and the second rotor are so disposed that a first phase angle and a second phase angle are different from each other, the first phase angle being a phase angle formed by a center line of each set of the magnet bodies in the first rotor with respect to the core, and the second phase angle being a phase angle formed by a center line of each set of the magnet bodies in the second rotor with respect to the core, each of the center lines passing through a center of rotation.

3. The magnetic rotating apparatus according to claim 2, wherein, in the first rotor and the second rotor, the first phase angle and the second phase angle are so set that a detent torque caused by an attraction force between the core and the permanent magnet is compensated by the first rotor and the second rotor.

4. The magnetic rotating apparatus according to claim 2, wherein twelve of the cores are disposed in a circle in each of the first stator and the second stator.

5. The magnetic rotating apparatus according to claim 2, wherein the first stator and the first rotor constitute an electric motor, and the second stator and the second rotor constitute a generator.

6. A magnetic rotating apparatus, a motor generator, or an electric motor according to claim 1, wherein the magnet body is implemented as one permanent magnet by integrating two of the permanent magnets and the joint member.

7. A magnetic rotating apparatus comprising:
    a stator having a plurality of cores with a winding arranged at regular intervals along a circumferential direction; and
    a rotor which has a plurality of permanent magnets arranged at regular intervals along the circumferential direction and rotates facing the stator,
    wherein
    each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference,
    in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body,
    the rotor includes a first rotor and a second rotor, and
    in the first rotor and the second rotor, magnetic poles of the counter faces in the magnet bodies are so disposed that a first number of poles and a second number of poles are different from each other, the first number of poles being the number of magnetic poles formed by all of the magnet bodies in the first rotor, and the second number of poles being the number of magnetic poles formed by all of the magnet bodies in the second rotor.

8. A magnetic rotating apparatus comprising:
    a first stator and a second stator each of which has a plurality of cores with a winding arranged at regular intervals along a circumferential direction; and
    a first rotor and a second rotor each of which has a plurality of permanent magnets arranged at regular intervals along the circumferential direction, and rotate together,
    wherein
    the first stator and the first rotor are so disposed as to face each other, and the second stator and the second rotor are so disposed as to face each other,
    each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference, in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, and in two of the magnet bodies adjacent in the circumferential direction, magnetic poles of counter faces, which are pole faces opposed to the core, of the two permanent magnets close to each other are different from each other.

9. The magnetic rotating apparatus according to claim 8, wherein the first rotor and the second rotor are so disposed that a first phase angle and a second phase angle are different from each other, the first phase angle being a phase angle formed by a center line of each set of the magnet bodies in the first rotor with respect to the core, and the second phase angle being a phase angle formed by a center line of each set of the magnet bodies in the second rotor with respect to the core, each of the center lines passing through a center of rotation.

10. The magnetic rotating apparatus according to claim 9, wherein, in the first rotor and the second rotor, the first phase angle and the second phase angle are so set that a detent torque caused by an attraction force between the core and the permanent magnet is compensated by the first rotor and the second rotor.

11. The magnetic rotating apparatus according to claim 8, wherein the first rotor and the second rotor are coupled to rotate together in a state where a first phase angle and a second phase angle are shifted from each other, the first phase angle being a phase angle formed by a center line of each set of the magnet bodies in the first rotor with respect to the core in the first stator, and the second phase angle being a phase angle formed by a center line of each set of the magnet bodies in the second rotor with respect to the core in the second stator, each of the center lines passing through a center of rotation.

12. The magnetic rotating apparatus according to claim 11, wherein
in each of the first rotor and the second rotor, eight of the permanent magnets arranged in a circle form four of the magnet bodies, and
a difference between the first phase angle and the second phase angle is 45 degrees.

13. The magnetic rotating apparatus according to claim 8, wherein, in the first rotor and the second rotor, magnetic poles of the counter faces in the magnet bodies are so disposed that a first number of poles and a second number of poles are different from each other, the first number of poles being the number of magnetic poles formed by all of the magnet bodies in the first rotor, and the second number of poles being the number of magnetic poles formed by all of the magnet bodies in the second rotor.

14. A magnetic rotating apparatus comprising:
a first stator and a second stator each of which has a plurality of cores with a winding arranged at regular intervals along a circumferential direction; and a first rotor and a second rotor each of which has a plurality of permanent magnets arranged at regular intervals along the circumferential direction, and rotate together, wherein the first stator and the first rotor are so disposed as to face each other, and the second stator and the second rotor are so disposed as to face each other, each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference, in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, and in two of the magnet bodies adjacent in the circumferential direction, magnetic poles of counter faces, which are pole faces opposed to the core, of the two permanent magnets close to each other are different in either one of the first rotor and the second rotor, and are same in the other.

15. The magnetic rotating apparatus according to claim 14, wherein the first rotor and the second rotor are coupled to rotate together in a state where a first phase angle and a second phase angle are equal to each other, the first phase angle being a phase angle formed by a center line of each set of the magnet bodies in the first rotor with respect to the core, and the second phase angle being a phase angle formed by a center line of each set of the magnet bodies in the second rotor with respect to the core, each of the center lines passing through a center of rotation.

16. The magnetic rotating apparatus according to claim 15, wherein
in the first rotor, 8n (n is an integer) of the permanent magnets arranged in a circle form 4n of the magnet bodies, in two of the magnet bodies adjacent in the circumferential direction, magnetic poles of counter faces, which are pole faces opposed to the core, of two of the permanent magnets close to each other are different from each other, so that magnetic poles of 8n poles are formed, and
in the second rotor, 8m (m is an integer) of the permanent magnets arranged in a circle form 4m of the magnet bodies, in two of the magnet bodies adjacent in the circumferential direction, magnetic poles of counter faces, which are pole faces opposed to the core, of two of the permanent magnets close to each other are the same as each other, so that magnetic poles of 4m poles are formed.

17. A motor generator comprising:
an electric motor;
a generator; and
a rotary shaft provided common to the electric motor and the generator,
wherein
each of the electric motor and the generator includes a stator having a plurality of cores with a winding arranged at regular intervals along a circumferential direction, and a rotor which has a plurality of permanent magnets arranged at regular intervals along the circumferential direction and rotates facing the stator, the electric motor and the generator are same in angular interval in arrangement of the plurality of cores in the circumferential direction, and in angular interval in arrangement of the plurality of permanent magnets in the circumferential direction, each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference, in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, in two of the magnet bodies adjacent in the circumferential direction, magnetic poles of the counter faces of the two permanent magnets close to each other are different from each other, and the rotor in the electric motor and the rotor in the generator are coupled to rotate together in a state where a first phase angle and a second phase angle are shifted from each other, the first phase angle being a phase angle formed by a center line of each set of the magnet bodies in the rotor in the electric motor with respect to the core in the stator in the electric motor, and the second phase angle being a phase angle formed by a center line of each set of the magnet bodies in the rotor in the generator with respect to the core in the stator in the generator, each of the center lines passing through a center of rotation.

18. The motor generator according to claim 17, wherein in each of the rotor in the electric motor and the rotor in the generator, eight of the permanent magnets arranged in a circle form four of the magnet bodies, and a difference between the first phase angle and the second phase angle is 45 degrees.

19. A motor generator comprising:
an electric motor;
a generator; and
a rotary shaft provided common to the electric motor and the generator,
wherein
each of the electric motor and the generator includes
a stator having a plurality of cores with a winding arranged at regular intervals along a circumferential direction, and
a rotor which has a plurality of permanent magnets arranged at regular intervals along the circumferential direction and rotates facing the stator,
the electric motor and the generator are same in angular interval in arrangement of the plurality of cores in the circumferential direction, and in angular interval in arrangement of the plurality of permanent magnets in the circumferential direction, each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference, in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, in two of the magnet bodies adjacent in the circumferential direction, magnetic poles of the counter faces of the two permanent magnets close to each other are different from each other in the rotor of the electric motor, and in two of the magnet bodies adjacent in the circumferential direction, magnetic poles of the counter faces of the two permanent magnets close to each other are the same as each other in the rotor of the generator.

20. The motor generator according to claim 19, wherein the number of poles of magnetic poles formed by all of the magnet bodies in the rotor of the electric motor is 8, and the number of poles of magnetic poles formed by all of the magnet bodies in the rotor of the generator is 4.

21. An electric motor comprising:
a stator having a plurality of cores with a winding arranged at regular intervals along a circumferential direction; and
a rotor which has a plurality of permanent magnets arranged at regular intervals along the circumferential direction and rotates facing the stator,
wherein
each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference, in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body, and in a free state, the rotor stops in a state where, in each of the magnet bodies, two apexes which are corners, closer to the cores, of two of the counter faces, specifically, one of apexes of the counter face on a rear side in a rotational direction of the rotor is positioned at an edge, on a front side in the rotational direction of the rotor, of an end face of the core opposed, and another one of apexes of the counter face on the front side in the rotational direction of the rotor is positioned at an edge, on the rear side in the rotational direction of the rotor, of an end face of the core opposed.

22. The electric motor according to claim 21, wherein, in two of the magnet bodies adjacent in the circumferential direction, magnetic poles of counter faces, which are pole faces opposed to the core, of the two permanent magnets close to each other are different from each other.

23. The electric motor according to claim 21, wherein
in the stator, twelve of the cores are so disposed that a central angle formed by the cores adjacent to each other is 30 degrees,
in the rotor, eight of the permanent magnets disposed in a circle form four of the magnet bodies, and eight of the apexes of the eight permanent magnets are so disposed that a central angle formed by the apexes is 45 degrees, and
two of the counter faces of each of the magnet bodies are so stopped to face end faces of two of the cores disposed with one of the cores interposed therebetween.

24. A motor generator comprising:
an electric motor according to claim 21; and
a generator including a rotary shaft rotating coaxially with a rotary shaft of the electric motor,
wherein
the generator includes a second stator which has a plurality of cores with a winding arranged at regular intervals along a circumferential direction, and a second rotor which has a plurality of permanent magnets arranged at regular intervals along the circumferential direction and rotates facing the second stator, and
in the second rotor, each of the permanent magnets has a rectangular shape as viewed from an axial direction, and has magnetic poles of an N-pole and an S-pole formed along a tangential direction of a circumference.

25. The motor generator according to claim 24, wherein, in the generator, the permanent magnets are so disposed that polarities of magnetic poles opposed to each other are same between two of the permanent magnets adjacent in the circumferential direction.

26. The electric motor according to claim 21, wherein
in the stator, twelve of the cores are so disposed that a central angle formed by the cores adjacent to each other is 30 degrees, and
in the rotor, sixteen of the permanent magnets disposed in a circle form eight of the magnet bodies, and the eight magnet bodies are so disposed that a central angle formed by the magnet bodies is 45 degrees.

27. A motor generator comprising:
an electric motor according to claim 26; and
a generator including a rotary shaft rotating coaxially with a rotary shaft of the electric motor,
wherein
the generator includes a second stator which has a plurality of cores with a winding arranged at regular intervals along a circumferential direction, and a second rotor which has a plurality of permanent magnets arranged at regular intervals along the circumferential direction and rotates facing the second stator,
in the second rotor, sixteen of the permanent magnets disposed in a circle form eight of the magnet bodies, and the eight magnet bodies are so disposed that a central angle formed by the magnet bodies is 45 degrees, and
the rotor and the second rotor rotate together in a state where a phase angle by the magnet body of the rotor and a phase angle by the magnet body of the second rotor are shifted from each other by 22.5 degrees.

28. The electric motor according to claim 21, comprising a control unit configured to control a current passing through the winding of the electric motor,
wherein the control unit includes a switching portion configured to turn ON or OFF the current passing through the winding of each of the cores so that each of the magnet bodies repels against a counter face on a rear side of a rotational direction of the rotor, and so that each of the magnet bodies attracts the counter face on a front side of the rotational direction of the rotor.

29. The electric motor according to claim 28, wherein the control unit includes a timing control portion configured to perform control such that the switching portion is turned ON when an apex on the rear side of the rotational direction of the permanent magnet reaches a center of the core and onward, and that the switching portion is turned OFF when the apex is rotated by 27.5 degrees from the center of the core.

30. A motor generator comprising:
an electric motor;
a generator; and
a rotary shaft provided common to the electric motor and the generator,
wherein
the electric motor includes
    a stator having a plurality of cores with a winding arranged at regular intervals along a circumferential direction, and
    a rotor which has a plurality of permanent magnets arranged at regular intervals along the circumferential direction and rotates facing the stator,
each of the permanent magnets has a counter face which is a pole face opposed to the core and has any one of magnetic poles of an N-pole and an S-pole, and each of the permanent magnets is so disposed that the counter face has an inclination angle with respect to a tangential direction of a circumference,
in each set of magnet bodies including two of the permanent magnets adjacent in the circumferential direction, the two permanent magnets are so disposed that two counter faces have magnetic poles different from each other and are inclined reversely with respect to the tangential direction of the circumference, and the two permanent magnets are magnetically connected through a joint member made of a magnetic material so that the two counter faces act as magnetic poles in both ends of the magnet body,
in a free state, the rotor stops in a state where at least a part of at least one of the counter faces in each of the magnet bodies is opposed to an end face of the core,
the generator includes a second stator which has a plurality of cores with a winding arranged at regular intervals along a circumferential direction, and a second rotor which has a plurality of permanent magnets arranged at regular intervals along the circumferential direction and rotates facing the second stator,
in the second rotor, each of the permanent magnets has a rectangular shape as viewed from an axial direction, and has magnetic poles of an N-pole and an S-pole formed along a tangential direction of a circumference,
the permanent magnets are so disposed that polarities of magnetic poles opposed to each other are same between two of the permanent magnets adjacent in the circumferential direction,
in the second stator, twelve of the cores are so disposed that a central angle formed by the cores adjacent to each other is 30 degrees,
in the second rotor, eight of the permanent magnets are so disposed that a central angle formed by the permanent magnets adjacent to each other is 45 degrees, and when the rotor stops in a free state, the second rotor and the rotor rotate together at a phase angle which causes a state where, among eight of the permanent magnets, four permanent magnets forming a central angle of 90 degrees stop to be opposed to end faces of two of the cores disposed with two of the cores interposed therebetween.

* * * * *